(12) United States Patent
Russell

(10) Patent No.: US 8,875,661 B2
(45) Date of Patent: Nov. 4, 2014

(54) MULTIUSE ANIMAL CENTERLINE WEAVE DEVICE

(71) Applicant: David L. Russell, Knoxville, TN (US)

(72) Inventor: David L. Russell, Knoxville, TN (US)

( * ) Notice: Subject to any disclaimer, the term of this patent is extended or adjusted under 35 U.S.C. 154(b) by 126 days.

(21) Appl. No.: 13/736,026

(22) Filed: Jan. 7, 2013

(65) Prior Publication Data
US 2013/0118416 A1  May 16, 2013

Related U.S. Application Data

(63) Continuation-in-part of application No. 13/476,457, filed on May 21, 2012, now Pat. No. 8,347,822, which is a continuation of application No. 12/622,687, filed on Nov. 20, 2009, now Pat. No. 8,181,605, which is a continuation-in-part of application No. 12/018,560, filed on Jan. 23, 2008, now Pat. No. 7,819,085.

(60) Provisional application No. 60/886,329, filed on Jan. 24, 2007.

(51) Int. Cl.
*A01K 15/02* (2006.01)
*A63K 1/02* (2006.01)

(52) U.S. Cl.
CPC ............. *A01K 15/027* (2013.01); *A63K 1/02* (2013.01)
USPC .......................... 119/702; 119/703; 119/705

(58) Field of Classification Search
CPC ................................ A01K 15/027; A63K 1/02
USPC ................................ 119/702–705, 712; 482/14
See application file for complete search history.

(56) References Cited

U.S. PATENT DOCUMENTS

| 5,445,102 | A  | 8/1995  | Rupp    |
| 5,685,107 | A  | 11/1997 | Sweet   |
| 6,971,147 | B2 | 12/2005 | Halstead |
| 7,819,085 | B2 | 10/2010 | Russell |
| 8,181,605 | B2 | 5/2012  | Russell |
| 8,347,822 | B2 | 1/2013  | Russell |

OTHER PUBLICATIONS

Weybridge Agility web pages (Provided in Paper No. 20090804 for U.S. Appl. No. 12/018,560).
www.weybridgeagility.com—2005 (Provided in Paper No. 20120113 for U.S. Appl. No. 12/622,687).
http:/web.archive.org/web/20061024041454/www.affordableagility.com/weavescomp.htm—Oct. 24, 2006 (Provided in Paper No. 20090804 for U.S. Appl. No. 12/018,560).

*Primary Examiner* — Kristen C Hayes
(74) *Attorney, Agent, or Firm* — Knox Patents; Thomas A. Kulaga

(57) ABSTRACT

An apparatus for demonstrating animal agility. The multiuse centerline weave device includes a rail with interchangeable legs positioned on alternating sides of the rail. One set of interchangeable legs is a competition leg set that includes a plurality of legs each with an attached peg that connects to a weave pole. Another set of interchangeable legs is a sliding leg set that includes a plurality of legs each with a slider that moves a peg from the centerline of the rail to an outboard position relative to the rail. One type of slider has a peg attached to a plate that moves with the slider. Another type of slider has a tilting mechanism that tilts the peg in a plane perpendicular to the longitudinal axis of the rail.

20 Claims, 16 Drawing Sheets

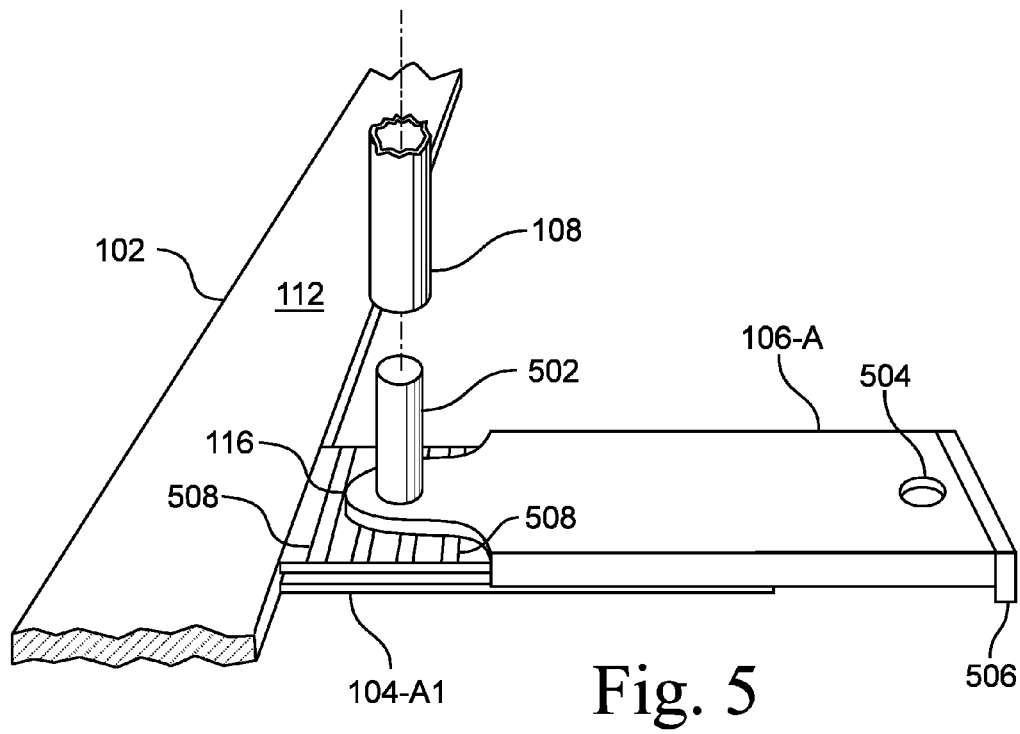
Fig. 5
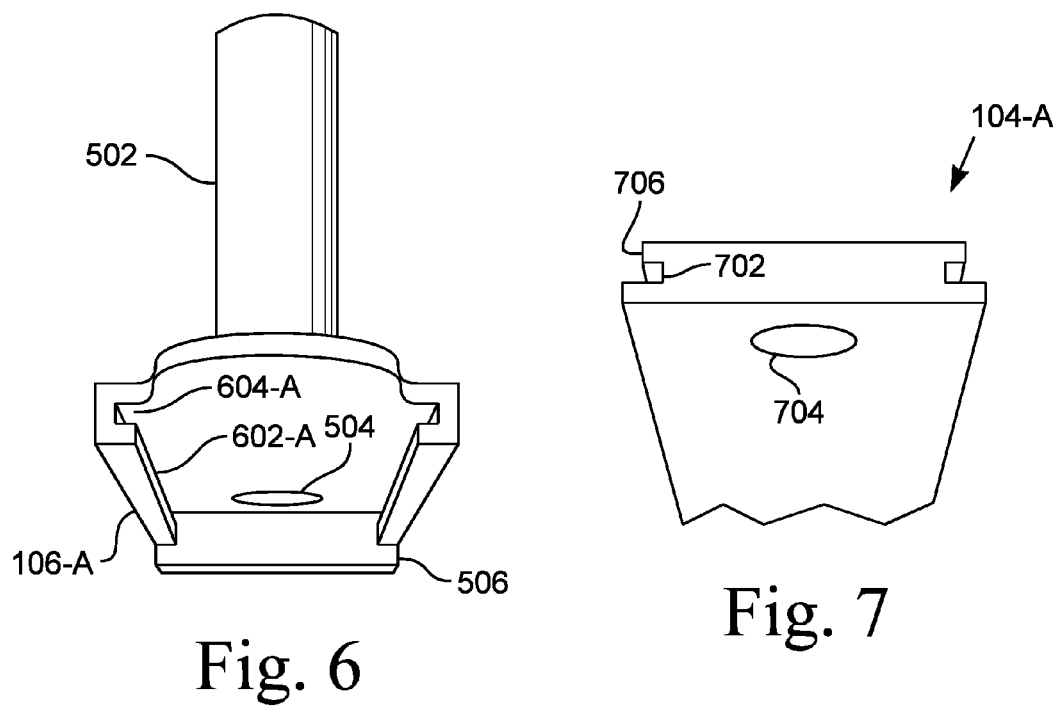
Fig. 6
Fig. 7

MULTIUSE ANIMAL CENTERLINE WEAVE DEVICE

CROSS-REFERENCE TO RELATED APPLICATIONS

This application is a continuation-in-part of U.S. Non-Provisional application Ser. No. 13/476,457, filed May 21, 2012, which is a continuation of U.S. Non-Provisional application Ser. No. 12/622,687, filed Nov. 20, 2009, and issued as U.S. Pat. No. 8,181,605 on May 22, 2012, which is a continuation-in-part of U.S. Non-Provisional application Ser. No. 12/018,560, filed Jan. 23, 2008, and issued as U.S. Pat. No. 7,819,085 on Oct. 26, 2010, which claims the benefit of U.S. Provisional Application No. 60/886,329, filed Jan. 24, 2007.

STATEMENT REGARDING FEDERALLY SPONSORED RESEARCH OR DEVELOPMENT

Not Applicable

BACKGROUND OF THE INVENTION

1. Field of Invention

This invention pertains to a multiuse centerline weave device for training and demonstrating animal agility. More particularly, in various embodiments, the multiuse centerline weave device includes interchangeable legs for the center rail, with each type of leg being configured for a particular use of the centerline weave device.

2. Description of the Related Art

Agility is the fastest growing dog sport in the USA. Numerous dog club events are sanctioned by such entities as the American Kennel Club, Inc. (AKC), the United States Dog Agility Association, Inc. (USDAA) and several other active organizations. Agility is also popular in many other parts of the world, especially Europe, where it was founded. In densely populated parts of the USA, exhibitors have a choice of agility trials within driving distance on virtually every weekend. Each trial averages several hundred dogs. There are numerous training facilities in every major metropolitan area. Regional, national and international competitions continue to spark an interest in the sport, and televised events are becoming more and more common.

Of all the obstacles required for successful dog agility competition, the most difficult to train and perform correctly is the weave poles. Even at the novice level, courses in most organizations contain a set of uniformly-spaced PVC poles (usually six), while more advanced levels mandate longer sets (usually twelve). The dog must enter the obstacle by passing between the first two poles from the right to the left, the next from left to right, and so on, continuing the alternating sequence for the full length of the set.

Equipment specifications are unique to each agility organization, and these specifications change from time to time. Many commonalities currently exist, and it is possible to manufacture a set that is suitable for regulation use by more than one organization. Some manufacturers offer a product choice that addresses these differences (e.g., spacing between poles) in order to support more rigorously the requirements of each organization.

A variety of different approaches to training weave poles has evolved since the sport first came to the USA in the 1980s. Some of these training approaches have led to modified designs for equipment that is practical for training, but not suitable for competition. Many manufacturers therefore offer two basic types of products: those for training weave pole skills and those that meet competition specifications.

BRIEF SUMMARY OF THE INVENTION

According to various embodiments of the present invention, a multiuse centerline weave device is provided. The multiuse device has a center rail configured to receive interchangeable leg members. The center rail is a channel with an end that receives a connector for attaching a second rail to the first to increase the number of weave poles.

One set of interchangeable leg members includes a set of competition legs. Each one of the competition legs includes a head, a peg, and a leg portion. The head fits inside the rail between the sides and is attached to the rail with fasteners. The peg of the competition leg is attached to the head and fits through an opening in the top of the rail such that the peg extends above the top of the rail. The leg portion of the competition leg fits through a slot in one of the sides of the rail thereby providing stability to the device.

A second set of interchangeable leg members includes a set of legs each with a slider having a fixed peg. The leg includes a head and a leg portion. The head fits inside the rail between the sides and is attached to the rail with fasteners. The leg includes a plug that fits through the peg opening in the top of the rail and the plug is flush with the top surface of the rail. The leg portion of the leg fits through a slot in one of the sides of the rail. The slider engages the leg portion and slides longitudinally along the leg portion between a position with the peg above the longitudinal axis of the rail to a position outboard of the rail.

A third set of interchangeable leg members includes a set of legs each with a slider having a tiltable peg assembly. The leg includes a head and a leg portion. The head fits inside the rail between the sides and is attached to the rail with fasteners. The leg includes a plug that fits through the peg opening in the top of the rail and the plug is flush with the top surface of the rail. The leg portion of the leg fits through a slot in one of the sides of the rail. The slider engages the leg portion and slides longitudinally along the leg portion between a position with the peg above the longitudinal axis of the rail to a position outboard of the rail. The tiltable peg assembly allows for adjusting the vertical angle of the weave poles by a tilting mechanism attached to the slider. The tilting mechanism allows the poles to be positioned at various angles. Where the selected angle causes the weave pole to be in a vertical position, the configuration conforms to regulation equipment specifications for all major agility organizations. In one embodiment, the tilting mechanism has an axle and a collar. The collar rotates about the axle. The position of the collar is fixed by tightening a fastener that causes the collar to clamp to the axle.

In one embodiment, the second and third set of interchangeable legs share the same legs with the sliders being configured as noted above. That is, the legs are the same but the slider is different for each set of interchangeable legs.

BRIEF DESCRIPTION OF THE SEVERAL VIEWS OF THE DRAWINGS

The above-mentioned features of the invention will become more clearly understood from the following detailed description of the invention read together with the drawings in which:

FIG. 5 is a partial perspective view of one embodiment of a leg and a slider.

FIG. 6 is a perspective view of the bottom of one embodiment of a slider.

FIG. 7 is a partial perspective view of one embodiment of a leg.

DETAILED DESCRIPTION OF THE INVENTION

An apparatus and method for a centerline weave device 100 is disclosed. Agility is a fast growing dog sport. One event for a dog agility competition is passage through a set of weave poles. This event requires the dog to follow a weaving path between a set of spaced parallel poles. Various weave pole devices are used to train the dogs for the event and are described herein. The various weave pole devices and components are generally indicated below with a generic item number. The particular embodiments and variations shown in the figures and described below have an alphanumeric suffix. For example, the centerline weave device is generically referenced with item number 100 and the individual embodiments of the weave devices are referenced as items 100-1, 100-2, etc.

Figure 1:
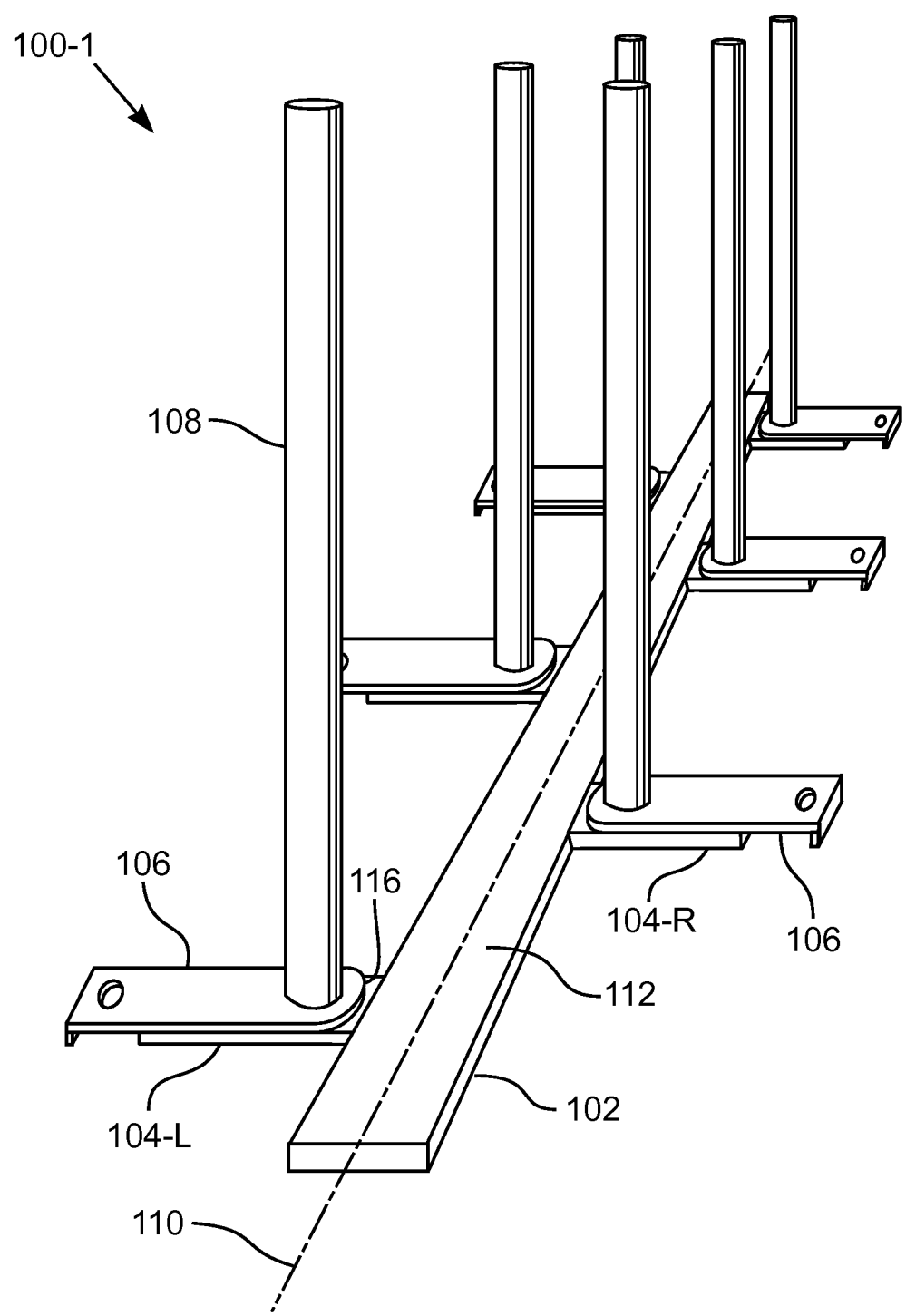
FIG. 1 is a perspective view of one embodiment of a weave trainer.

FIG. 1 illustrates a perspective view of one embodiment of a weave trainer 100-1. The weave trainer 100-1 includes a rail 102 that is an elongated, flat member. The top surface 112 of the rail 102 has a slip-resistant treatment, such as an etched surface or a non-skid paint or layer.

Extending from the rail 102 are legs 104 that alternate between opposite sides of the rail 102. In the illustrated embodiment, the first leg 104-L extends from the left side of the rail 102 and the second leg 104-R extends from the right side of the rail 102. The other legs 104 alternate in a like manner along the length of the rail 102.

Coupled to each leg 104 is a slider 106 that has a weave pole 108 extending upward from the proximal end 116 of the slider 106, which is nearest the centerline, or longitudinal axis, 110 of the rail 102. The sliders 106 slideably engage the legs 104 such that the distance of the poles 108 from the longitudinal axis 110 is adjustable.

Figure 2:
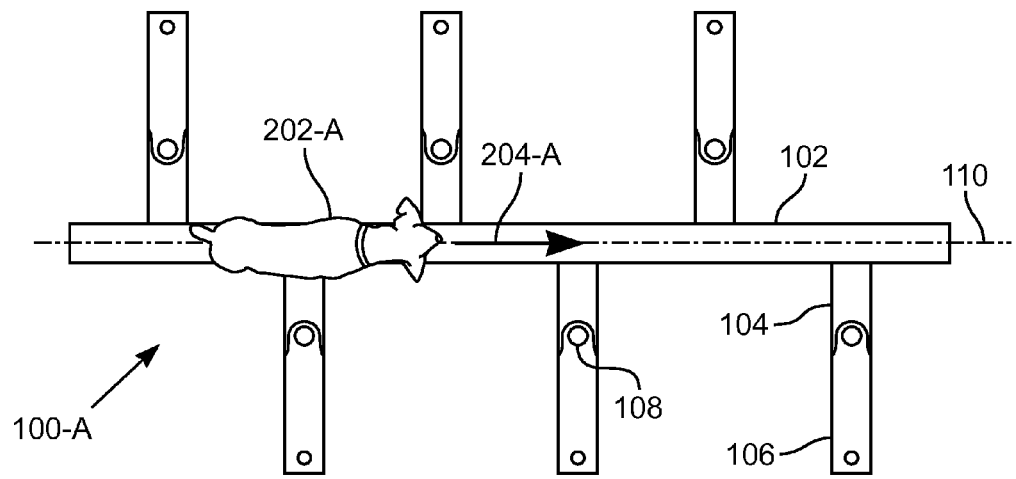
FIG. 2 is a top view of one embodiment of the weave trainer with the poles positioned such that a path is defined along the rail centerline.

FIG. 2 illustrates a top view of one embodiment of the weave trainer 100-A with the poles 108 positioned such that a path 204-A is defined parallel to and above the rail centerline 110. FIG. 2 illustrates an animal 202-A with its body aligned along the rail centerline 110 of the weave trainer 100 as the animal 202-A travels the path 204-A. In the illustrated configuration of the weave trainer 100-A, the sliders 106 carrying the poles 108 have been adjusted by sliding the sliders 106 along the legs 104 away from the rail centerline 110 such that the poles 108 are spaced away from the rail centerline 110 with a gap sufficient for the animal 202-A to pass along the rail centerline 110 without weaving.

FIG. 2 also illustrates an early step in the training method where the animal 202-A travels the path 204-A that follows the rail centerline 110 between the poles 108, which have been moved away from the centerline 110. In this step, the animal 202-A repeatedly traverses the weave trainer 100-A along the rail centerline 110. The animal 202-A becomes familiar with the weave trainer 100 and with moving between the poles 108 on alternating sides of the rail 102.

Figure 3:
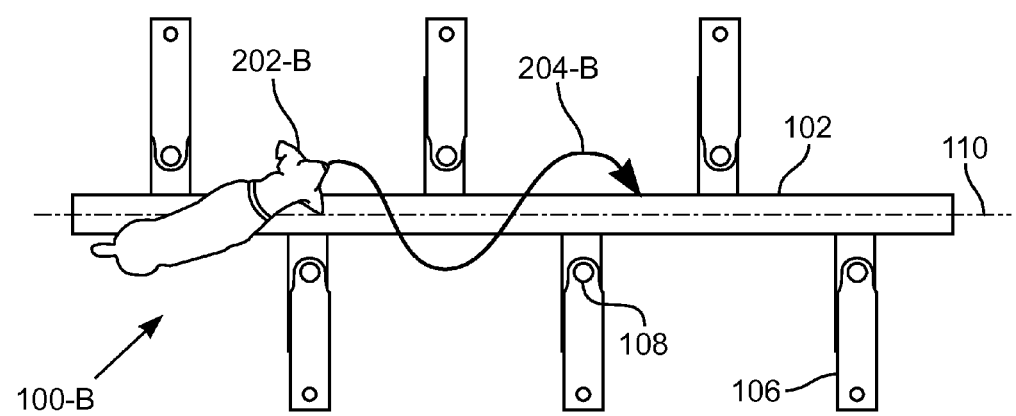
FIG. 3 is a top view of one embodiment of the weave trainer with the poles positioned such that a slightly weaving path is defined along the rail centerline.

FIG. 3 illustrates a top view of one embodiment of the weave trainer 100-B with the poles 108 positioned such that a slightly weaving path 204-B is defined along the rail centerline 110. The animal 202-B has its body slightly offset from being parallel with the rail centerline 110 as the animal 202-B travels the path 204-B. In the illustrated configuration of the weave trainer 100-B, the sliders 106 carrying the poles 108 have been adjusted by sliding the sliders 106 along the legs 104 away from the rail centerline 110 such that the poles 108 are spaced away from the rail centerline 110 with a gap sufficient for the animal 202-B to pass along the rail centerline 110 with a slight weaving.

FIG. 3 also illustrates a step in the training method following the step illustrated in FIG. 2. In this step, the animal 202-B travels the slightly weaving path 204-B between the poles 108, which have been moved slightly toward the rail centerline 110 relative to the configuration of the weave trainer 100-A illustrated in FIG. 2. In this step, the animal 202-B repeatedly traverses the weave trainer 100-B and the animal 202-B becomes familiar with following a slightly weaving path 204-B between the poles 108 on alternating sides of the rail 102.

Figure 4:
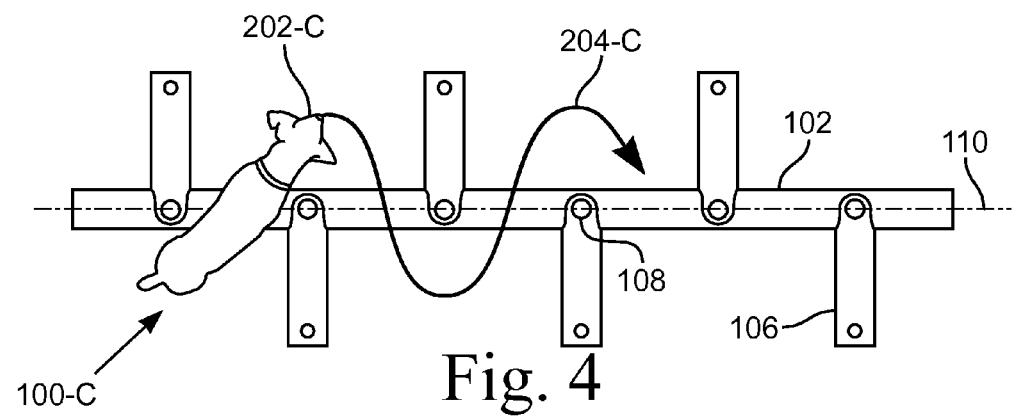
FIG. 4 is a top view of one embodiment of the weave trainer with the poles positioned above the rail centerline.

FIG. 4 illustrates a top view of one embodiment of the weave trainer 100-C with the poles 108 positioned above the rail centerline 110. The position of the poles 108 defines a weaving path 204-C along the rail centerline 110. The animal 202-C has its body significantly offset from being parallel with the rail centerline 110 as the animal 202-C travels the path 204-C. In the illustrated configuration of the weave trainer 100-C, the sliders 106 carrying the poles 108 have been adjusted by sliding the sliders 106 such that the poles 108 are above the rail centerline 110.

FIG. 4 also illustrates a step at the end of one embodiment on the training method. In this step the animal 202-C travels the weaving path 204-C around the poles 108 on the rail centerline 110. In this step, the animal 202-C travels the weaving path 204-C between the poles 108, which have been moved toward the rail centerline 110 from the configuration of the weave trainer 100-B illustrated in FIG. 3. In this step, the animal 202-C repeatedly traverses the weave trainer 100-C and the animal 202-C becomes familiar with traversing the weaving path 204-C between the poles 108.

FIGS. 2-4 illustrate the progression of steps in the training method, with the steps progressively training the animal 202 to traverse the weave trainer 100. The method of training includes the steps of having the animal 202-A follow a centerline path 204-A, followed by a step of having the animal 202-B follow a slightly weaving path 204-B, and followed by another step of having the animal 202-C traverse a weaving path 204-C. The position of the sliders 106 and the poles 108 for the middle step progressively moves from the configuration illustrated in FIG. 2 to the configuration illustrated in FIG. 4 as the animal 202 becomes familiar and comfortable with weaving between the poles 108. That is, the animal 202 repeated traverses a path 204 that progressively changes from a straight path 204-A to a weaving path 204-C.

Further, the rail 102 provides a visual cue to the animal 202. For the step illustrated in FIG. 2 where the animal 202-A travels a straight path 204-A, the rail provides a clear path for the animal 202-A to follow. For the steps where the animal 202-B, 202-C follows a weaving path 204-B, 204-C, the rail 102 provides indication of the general direction that the animal 202-B, 202-C is to travel. The constant presence of the rail 102 promotes learning the footwork required to traverse the weave trainer 100.

FIG. 5 illustrates a partial perspective view of one embodiment of a leg 104-A1 and a slider 106-A. FIG. 6 illustrates a perspective view of the bottom of one embodiment of a slider 106-A. FIG. 7 illustrates a perspective view of one embodiment of a leg 104-A1.

The illustrated embodiment of the slider 106-A includes a peg 502 extending upwards from the proximal end 116 of the slider 106-A. The peg 502 is a cylindrical member. The weave pole 108 is a hollow tube, such as a section of PVC pipe, that slides over and engages the peg 502. The proximal end 116 of the slider 106-A is contoured to minimize the surface of the slider 106-A that is exposed when the pole 108 is placed over the peg 502. By minimizing the exposure of the slider 106-A at the proximal end 116, there is less likelihood that the animal 202 will step on or otherwise be affected by the slider 106-A.

At the distal end of the slider 106-A is a stake hole 504 and an end plate 506. The stake hole 504 is dimensioned and configured to receive a stake to secure the slider 106-A to the ground in a fixed position relative to the rail 102. The end plate 506 extends below the tongue 602-A of the slider 106-A a distance such that the bottom of the end plate 506 is coplanar with the bottom surface of the rail 102. The end plate 506 supports the distal end of the slider 106-A when the slider 106-A is extended away from the rail centerline 110, such as illustrated in FIG. 2.

The leg 104-A1 is attached to the side of the rail 102 and extends away from the rail 102 perpendicular to the rail centerline 110. In various embodiments, the leg 104-A1 is permanently attached to the rail 102 or removably attached. The thickness of the leg 104-A1 is the same as the thickness of the rail 102; therefore, the bottom of the leg 104-C is coplanar with the bottom of the rail 102. The leg 104-A1 has a flat upper surface with markings 508 parallel with the rail centerline 110. The markings 508 are indicia of the distance the slider 106-A is extended away from the rail centerline 110. For example, when the proximal ends 116 of the sliders 106-A are all aligned with the same corresponding mark 508, the indication is that all the sliders 106-A are extended an equal distance and the poles 108 on each side of the rail 102 are coplanar. In various embodiments, the marks 508 are etched, engraved, or painted on the surface of the leg 104-A1 or are formed of strips of material affixed to the top of the leg 104-A1.

The distal end of the leg 104-A1 includes an opening 704 that registers with the stake hole 504 in the slider 106-A when the slider 106-A fully engages the leg 104-A1, that is, when the pole 108 is aligned with the rail centerline 110. When the opening 704 and the stake hole 504 are aligned, a stake fits into the pair of holes 504, 704. Also, when the slider 106-A is extended such that the stake hole 504 is past the end of the leg 104-A1, the stake clears the leg 104-A1 when inserted through the stake hole 504.

On each side of the leg 104-A1 is a slot 702 that engages the tongue 602-A of the slider 106-A. Above each slot 702 in the leg 104-A1 is a lip 706 that engages a groove 604-A in the slider 106-A. The tongue-and-groove configuration of the slider 106-A and leg 104-A1 secures the two 104-A1, 106-A such that the slider 106-A is able to move only to extend and retract. The tongue-and-groove configuration of the slider 106-A and leg 104-A1 allows for quick and repeated repositioning of the poles 108 by moving the slider 106-A along the leg 104-A1.

Figure 8:
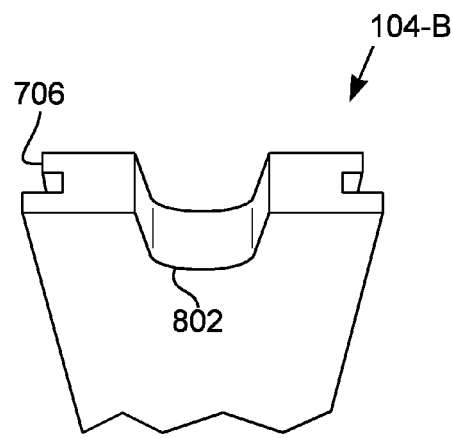
FIG. 8 is a partial perspective view of another embodiment of a leg.

FIG. 8 illustrates a partial perspective view of another embodiment of a leg 104-B. In the illustrated embodiment, the opening 802 at the distal end of the leg 104-B has a U-shape. The U-shaped opening 802 allows a stake inserted in the stake hole 504 in the slider 106 to pass by the leg 104-B when the slider 106 is in a fully retracted or almost fully retracted position.

Figure 9:
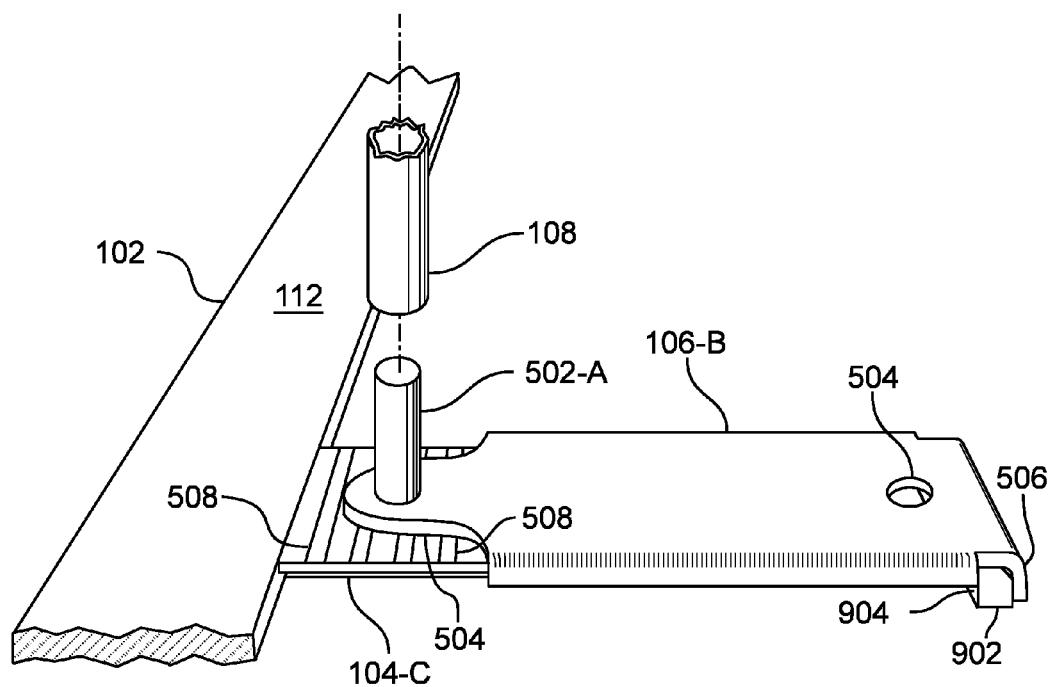
FIG. 9 is a partial perspective view of another embodiment of a leg and slider.
Figure 10:
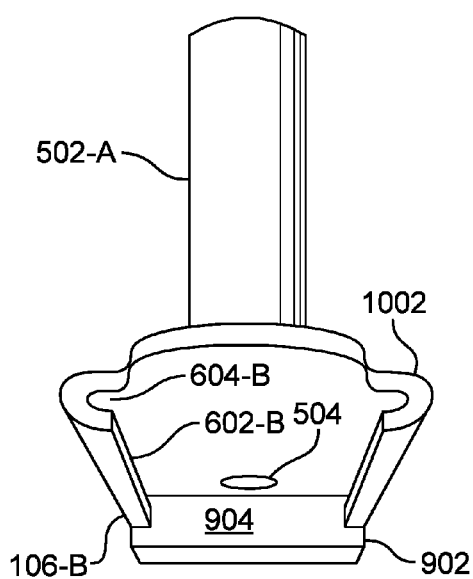
FIG. 10 is a perspective view of the bottom of another embodiment of a slider.
Figure 11:
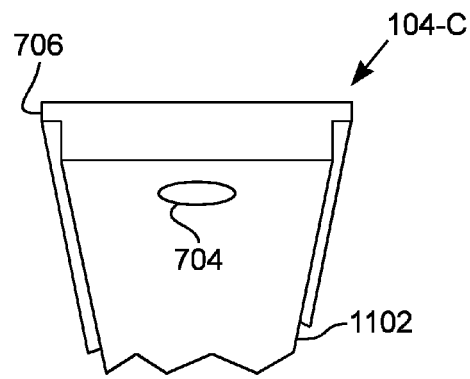
FIG. 11 is a partial perspective view of another embodiment of a leg.

FIG. 9 illustrates a partial perspective view of another embodiment of a leg 104-C and slider 106-B. FIG. 10 illustrates a perspective view of the bottom of another embodiment of a slider 106-B. FIG. 11 illustrates a partial perspective view of another embodiment of a leg 104-C.

In the illustrated embodiment, the slider 106-B includes a sheet of material bent to form a portion of the slider 106-B.

The distal end of the slider 106-B has the end wall 506 formed by bending the distal end of the slider 106-B downward. The side walls 1002 of the slider 106-B are curved to form a groove 604-B. Between the end wall 506 and the slider side walls 1002 is a block 902 with forward face 904. When the slider 106-B is fully retracted, the forward face 904 of the block 902 contacts the distal end of the leg 104-C. In one embodiment, the block 902 is a hard plastic such as nylon or an ultra high molecular weight (UHMW) polyethylene. In such an embodiment, the block 902 has some resilience and impact strength to soften and withstand the shock of the slider 106-B repeated striking the distal end of the leg 104-C when the slider 106-B is pushed to the retracted position. Also, the bottom of the plastic block 902 provides a smooth flat surface for sliding along the ground when the slider 106-B is moved between the retracted and extended positions. The block 902 is wider in the direction of movement of the slider 106-B than the end wall 506 of the embodiment illustrated in FIG. 5. In another embodiment, the edges of the block 902 that are perpendicular to the direction of travel of the slider 106-B are rounded to avoid the block 902 catching or digging into the ground when the slider 106-B is moved.

In the illustrated embodiment of the slider 106-B, the side walls 1002 are curved to form a tongue 602-B and a groove 604-B. The leg 104-C has a lip 706 extending to the sides above a block portion 1102 of the leg 104-C. The thickness of the leg 104-C is the same as the thickness of the rail 102; therefore, the bottom of the block portion 1102 of the leg 104-C is coplanar with the bottom of the rail 102. The lip 706 of the leg 104-C engages the groove 604-B of the slider 106-B and thereby slideably secures the slider 106-B to the leg 104-C.

Figure 13:
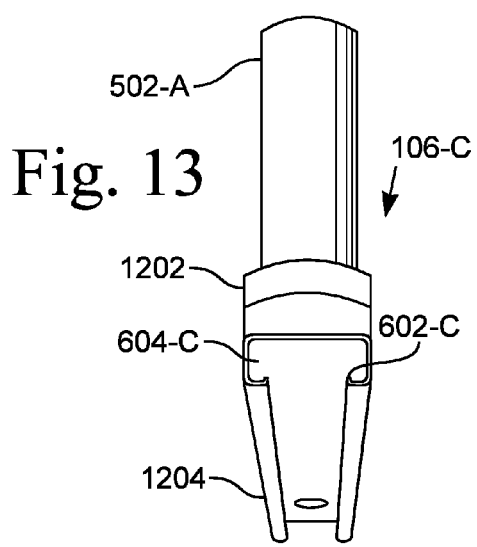
FIG. 13 is a perspective view of the bottom of the slider shown in FIG. 12.
Figure 12:
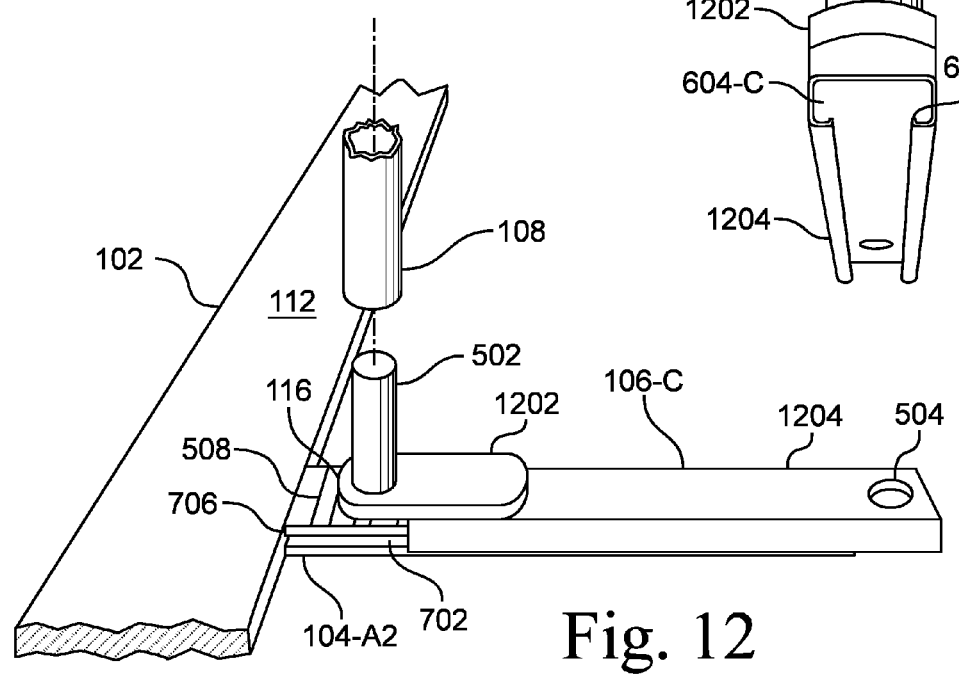
FIG. 12 is a partial perspective view of another embodiment of a slider.

FIG. 12 illustrates a partial perspective view of another embodiment of a slider 106-C. FIG. 13 illustrates a perspective view of the bottom of the slider 106-C shown in FIG. 12.

In the illustrated embodiment, the slider 106-C includes a slider plate 1202, a peg 502, and a slider channel 1204. The slider plate 1202 is a flat plate with rounded ends that connects the peg 502 to the slider channel 1204. The peg 502 is attached to and extends upwards from the end 116 of the slider plate 1202 proximal to the rail 102. The width of the slider plate 1202 is minimized such that only a small ledge is provided for the placement of a pole 108 over the peg 502. By minimizing the exposure of the slider plate 1202 at the proximal end 116, there is less likelihood that the animal 202 will step on or otherwise be affected by the slider plate 1202.

The slider channel 1204 includes a curved edge or tongue 602-C and a groove 604-C. On each side of the leg 104-A2 is a slot 702 that engages the tongue 602-C of the slider channel 1204. Above each slot 702 in the leg 104-A2 is a lip 706 that engages a groove 604-C in the slider channel 1204. The tongue-and-groove configuration of the slider channel 1204 and leg 104-A2 secures the two 104-A2, 1204 such that the slider channel 1204 is able to move only to extend and retract.

In the illustrated embodiment, the slider plate 1202 and peg 502 are cantilevered where they are attached to the slider channel 1204 such that the proximal end 116 of the slider plate 1202 becomes the proximal end 116 of the slider 106-C. In other embodiments, the peg 502 is attached directly to the slider channel 1204. The tongue-and-groove configuration of the slider 106-C and leg 104-A2 allows for quick and repeated repositioning of the poles 108 by moving the slider 106-C along the leg 104-A2. The slider 106-C allows a portion of the slider plate 1202 to extend over the rail 102 and locate the pole 108 over the rail centerline 110.

Figure 14:
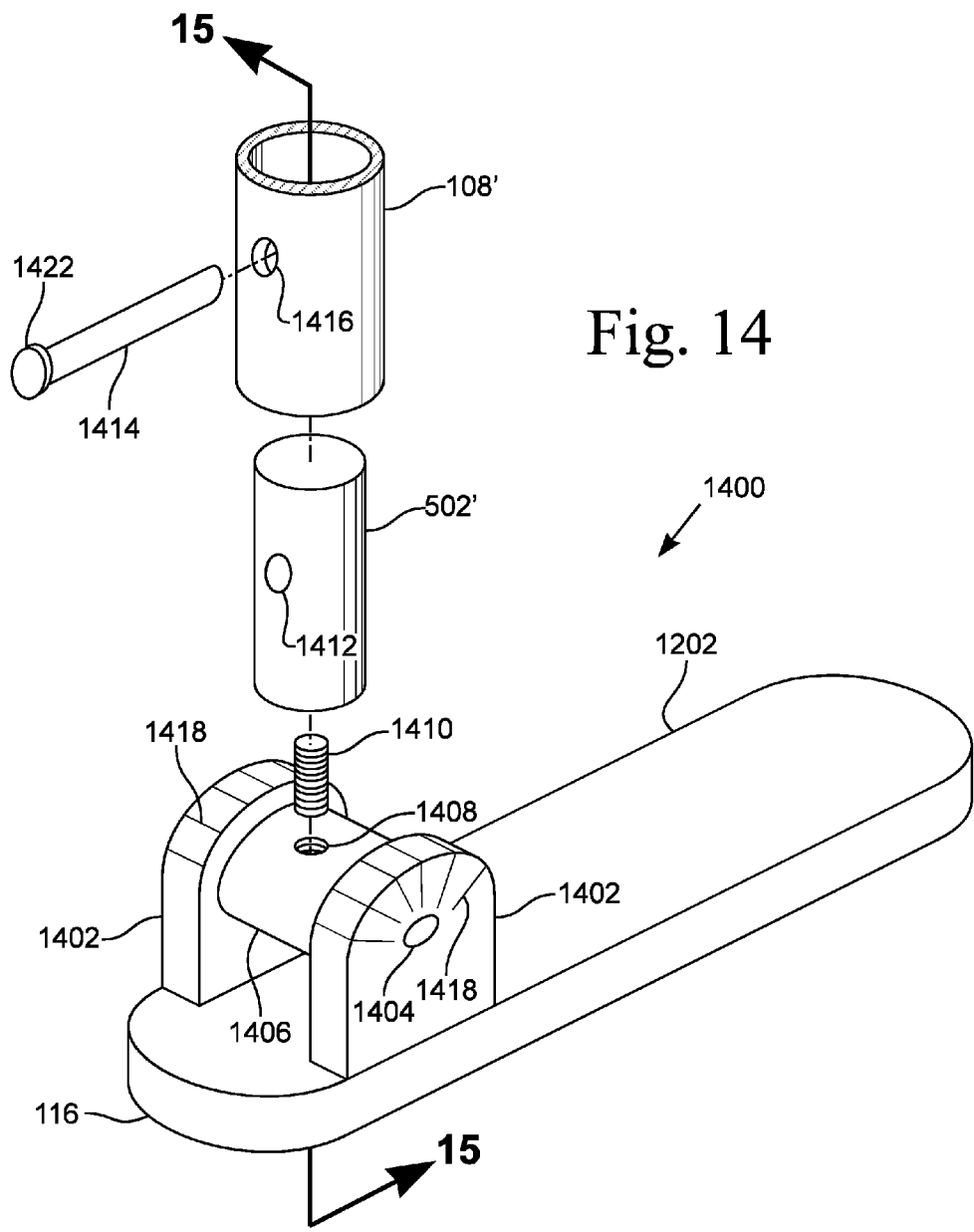
FIG. 14 is an exploded perspective view of one embodiment of a pivot mechanism.
Figure 15:
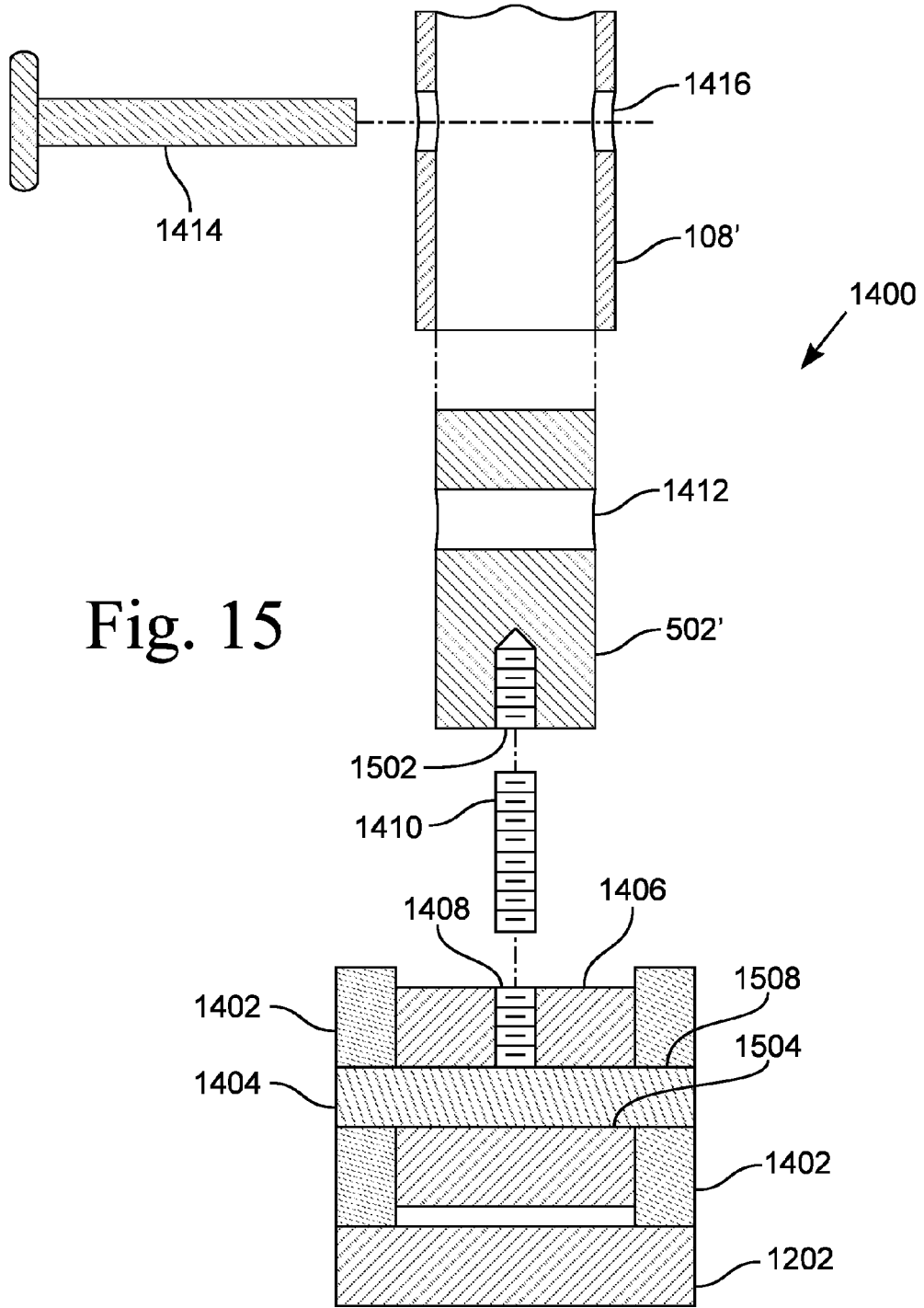
FIG. 15 is an exploded front view of the pivot mechanism shown in FIG. 14.

FIG. 14 illustrates an exploded perspective view of one embodiment of a pivot mechanism 1400. FIG. 15 illustrates an exploded front view of the pivot mechanism 1400 shown in FIG. 14.

The pivot mechanism 1400 includes an axle 1404 and a collar 1406. The axle 1404 is supported by two bearing walls 1402. The bearing walls 1402 are attached to and extend upwards from the proximal end 116 of a slider plate 1202. The bearing walls 1402 are parallel to each other. The longitudinal axis of the axle 1404 is perpendicular to the longitudinal axis of the slider plate 1202. In the illustrated embodiment, the axle 1404 is secured in an axle hole 1508 in each of the bearing walls 1402 and terminates flush with the outside surfaces of the bearing walls 1402. In various embodiments, the axle 1404 is attached to the bearing walls 1402 by welding the ends of the axle 1404 to the bearing walls 1402 or by applying an adhesive to the axle 1404 and axle hole 1508 interface or by other means commonly known in the art. In the illustrated embodiment, the pivot mechanism 1400 is attached to a slider plate 1202. In other embodiments, the pivot mechanism 1400 is attached to a rail 102 or to a leg 104 or to a slider 106 or to another surface.

The bearing walls 1402 are separated a distance slightly greater than the width of the collar 1406. The collar 1406 is a thick-walled cylinder. A hole 1504 passes through the central axis of the collar 1406. The hole 1504 receives the axle 1404 such that the collar 1406 rotates about the axle 1404. The hole 1504 is dimensioned so that the movement of the collar 1406 about the axle 1404 is substantially rotational. The collar 1406 has a threaded through-hole 1408 that provides access to the axle 1404 by a stud 1410. In the illustrated embodiment, the through-hole 1408 has a longitudinal axis that is perpendicular to and intersects the axis of rotation of the collar 1406.

Each bearing wall 1402 extends upward from the slider plate 1202 and has a full radius at the top. In the illustrated embodiment, the radius at the top of the bearing wall 1402 is larger than and concentric with the outside surface of the collar 1406. In another embodiment, the radius at the top of the bearing wall 1402 is the same size as the outside surface of the collar 1406. In various other embodiments, the shape of the top of the bearing wall 1402 is not a full radius, but has sharp corners, or is not concentric with the outside surface of the collar 1406, or is otherwise different than the outside surface of the collar 1406. The axle 1404 holds the collar 1406 above the surface of the slider plate 1202.

In the illustrated embodiment, the pivot mechanism 1400 includes a dowel or peg 502' and a stud 1410. The dowel 502' is a cylindrical member with a threaded hole 1502 in one end. The longitudinal axis of the threaded hole 1502 is coaxial to the longitudinal axis of the dowel 502'. The threaded hole 1502 receives the stud 1410. The stud 1410 is a threaded fastener. One end of the stud 1410 is fixedly installed into the threaded hole 1502 of the dowel 502'. With the stud 1410 installed, the dowel 502' acts as a head for the portion of the threaded stud 1410 extending from the dowel 502'. In various embodiments, the dowel and stud are one piece or the stud is welded or glued or otherwise affixed to the dowel.

With the stud 1410 fixed in the end of the dowel 502', the stud 1410 is threaded into the through-hole 1408 of the collar 1406 by turning the dowel 502' clockwise. The collar 1406 is fixed in a position by turning the dowel 502' until the other end of the threaded stud 1410 makes contact with the axle 1404 and is tightened against the axle 1404. The collar 1406 is released from the set position by turning the dowel 502' counter-clockwise until the other end of the threaded stud 1410 is free of contact with the axle 1404. When the collar 1406 is released from the set position and the stud 1410 remains threaded into the through-hole 1408, the dowel 502' rotates about the axle 1404 to a desired position.

The collar 1406 and stud 1410 are a clamp with the stud 1410 providing the clamping force that secures the clamp to the axle 1404. Tightening the stud 1410 against the axle 1404 forces the inside surface of the collar 1406 opposite the through-hole 1408 against the axle 1404, thereby clamping the axle 1404.

The dowel 502' has a through-hole 1412 passing through the cylindrical surface that is perpendicular to the longitudinal axis. A weave pole 108' is secured to the pivot mechanism 1400 by a pin 1414. The pole 108' has a pair of coaxial pin holes 1416. The pin holes 1416 pass through the walls of the pole 108'. The pin holes 1416 are perpendicular to and intersect the longitudinal axis of the pole 108'.

The weave pole 108' is secured to the pivot mechanism 1400 by positioning the weave pole 108' over the dowel 502' such that the pin holes 1416 of the pole 108' register with the through-hole 1412 of the dowel 502'. The pin 1414 fits through the holes 1416, 1412, thereby securing the weave pole 108' to the dowel 502'. To loosen and secure the collar 1406 about the axle 1404, the pole 108' turns the stud 1410. When the collar 1406 is loosened, the angle of the pole 108' is adjustable. In the illustrated embodiment, the pin 1414 has a cylindrical body and a head 1422 contoured to the shape of the pole 108'. In various embodiments, the pin 1414 may be a cotter pin, clevis pin, detent pin, cotterless clevis pin, headless pin, or other fastener so long as the shape of the pin 1414 and the head 1422, if present, pose a minimal threat to the animal 202 or the hazardous part of the pin 1414 is shielded. Hazards from the pin 1414 configuration include snagging the fur or scraping the leg or foot of the animal 202.

Each bearing wall 1402 is marked with indicia 1418 to indicate the angular position of the pole 108'. In one embodiment, the indicia 1418 is aligned with the center of a pole 108'. When a pole 108' is positioned at an indicia 1418 on the bearing walls 1402, the angular position of the pole 108' is known. When each of the poles 108' on one side of a weave trainer 100 are positioned to the same corresponding indicia 1418 on the bearing walls 1402, the position of the poles 108' on that side of the weave trainer 100 are uniform.

Figure 16:
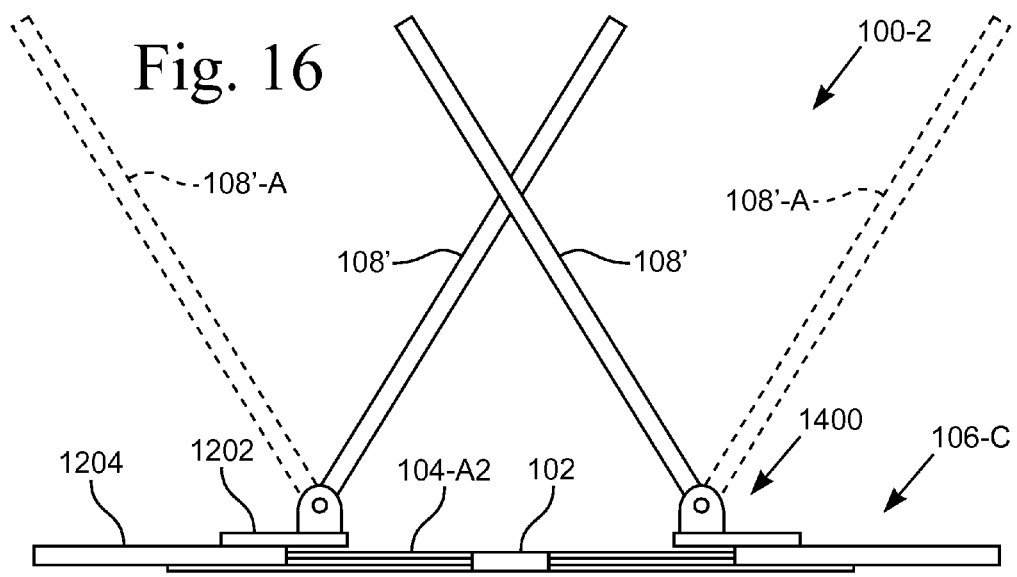
FIG. 16 is a front view of another embodiment of a weave trainer.

FIG. 16 illustrates a front view of another embodiment of a weave trainer 100-2. In the illustrated embodiment, the poles 108' are positioned at an angle to accommodate various weave training methods. The pivot mechanism 1400 allows the angle of the weave poles 108' to be adjusted in a plane perpendicular to the longitudinal axis 110 of the rail 102. The animal 202 uses the angled poles 108' as a visual and tactile guide to learn in what order and on what side the animal 202 is to pass the poles 108' when traversing the weave to demonstrate its agility. The illustrated configuration supports the training method where the animal 202 walks along the rail 102 through the triangular opening by ducking below each angled pole 108' along the way. The side of the pole 108' that the animal 202 ducks under is the same side of the pole 108' that the animal 202 passes when traversing the rail 102 in a demonstration of agility. Although the illustrated embodiment shows the pivot mechanism 1400 attached to a leg 104-A2 as illustrated in FIGS. 12 and 13, in other embodiments, the weave trainer 100-2 includes pivot mechanisms 1400 attached to other embodiments of the leg 104.

FIG. 16 also illustrates a configuration of the weave poles 108'-A (shown in dashed lines). The poles 108'-A are angled outwards away from the rail 102. The poles 108'-A assume a truncated V-shape. The animal traverses the weave trainer 100-2 through a passage with the poles 108'-A angled away from the animal's body.

Figure 17:
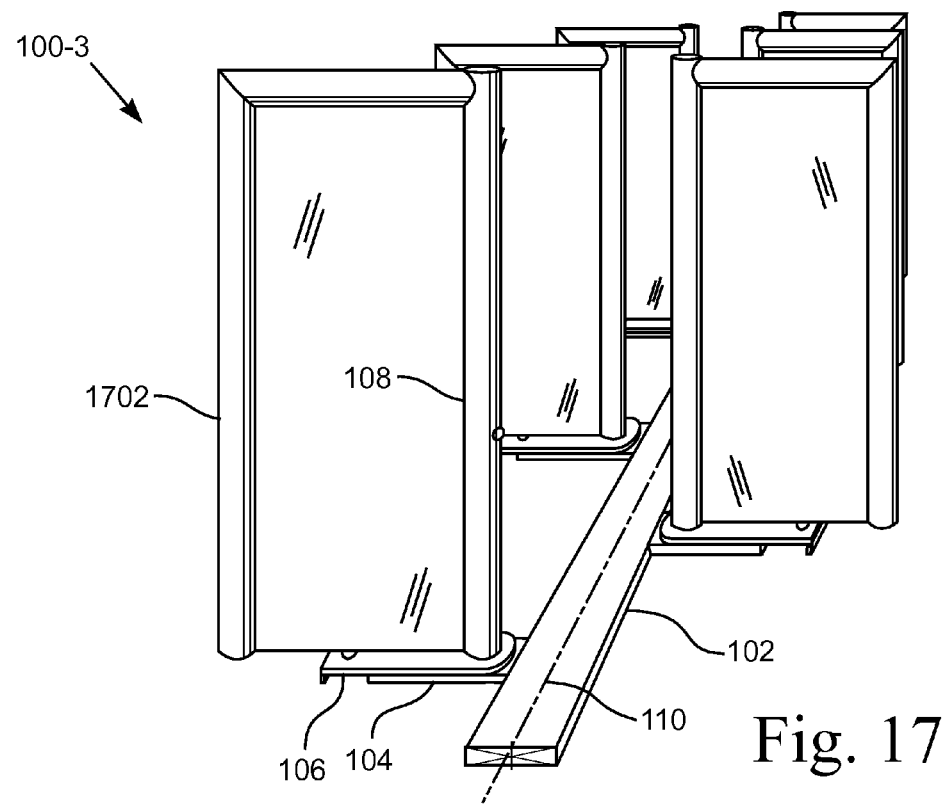
FIG. 17 is a perspective view of another embodiment of a weave trainer.

FIG. 17 illustrates a perspective view of another embodiment of a weave trainer 100-3. In the illustrated embodiment, the poles 108 form one side of a gate 1702. The gates 1702 extend away from the rail centerline 110. The animal 202 uses the gates 1702 as visual and physical barriers when learning to traverse the various weaving paths 204 of the weave trainer 100-3. In one embodiment, the poles 108 are restrained from rotating relative to the sliders 106, thereby ensuring the proper orientation of the gates 1702 to the rail centerline 110.

Figure 18:
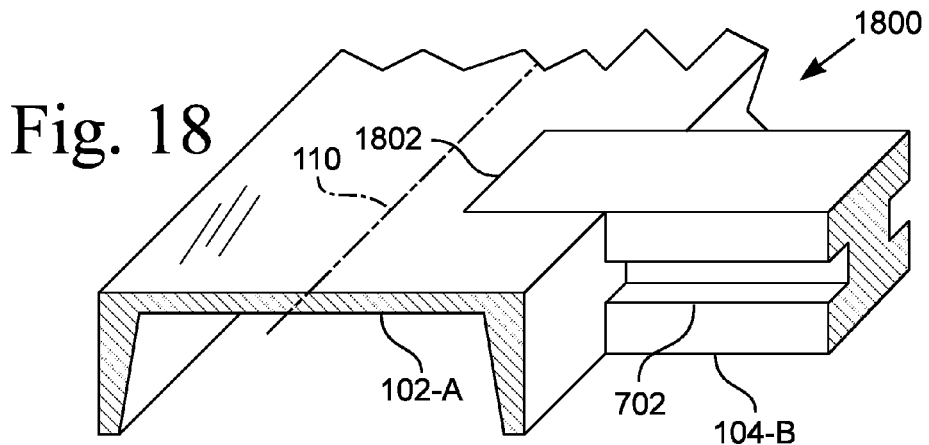
FIG. 18 is a partial perspective view of one embodiment of a joint between a rail and a leg.
Figure 19:
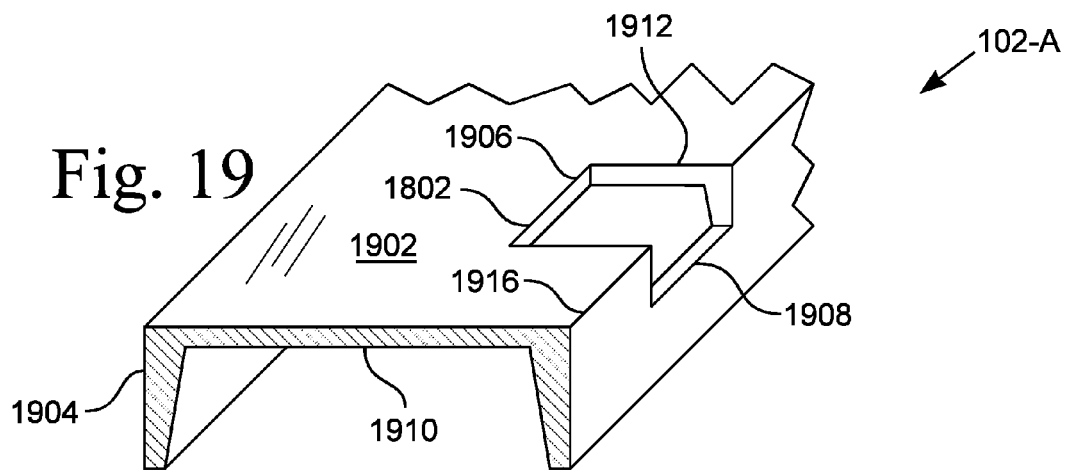
FIG. 19 is a partial perspective view of the rail shown in FIG. 18.
Figure 20:
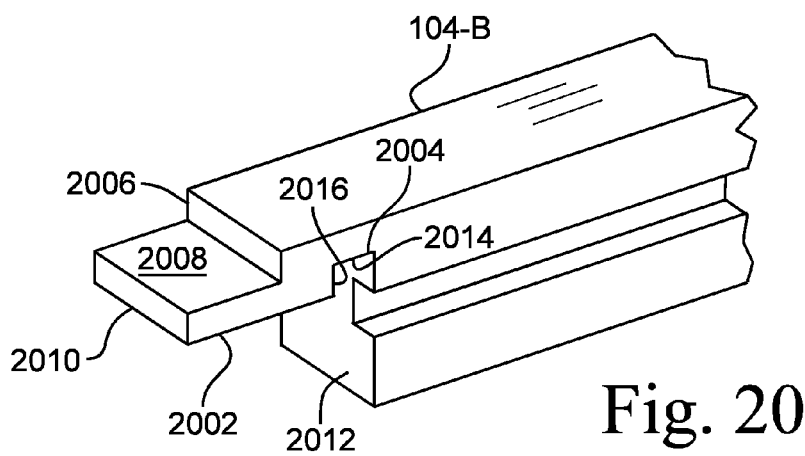
FIG. 20 is a partial perspective view of the leg shown in FIG. 18.

FIG. 18 illustrates a partial perspective view of one embodiment of a joint 1800 between a rail 102-A and a leg 104-B. FIG. 19 illustrates a partial perspective view of the rail 102-A shown in FIG. 18. FIG. 20 illustrates a partial perspective view of the leg 104-B shown in FIG. 18.

The rail 102-A is a channel with a base wall 1902 and two side walls 1904. The base wall 1902 has an inside face, or surface, 1910 that defines the lower extent of the base wall 1902. The side walls 1904 attach to the base wall 1902 at corners 1916 that run the length of the rail 102-A. The rail 102-A has a window 1802 in a corner 1916 where a leg 104-B connects with the rail 102-A. In the illustrated embodiment, the window 1802 passes through the entire thickness of the base wall 1902 and the side wall 1904. The window 1802 has a length defined by two parallel faces 1912 that lie in planes that are perpendicular to the longitudinal axis 110 of the rail 102-A.

The window 1802 is further defined by a bearing face 1908 and a stop 1906. The bearing face 1908 is a planar surface that is the top of the side wall 1904. The stop 1906 is a planar surface adjacent to the base wall 1902. The bearing face 1908 and stop 1906 are perpendicular to their respective adjacent walls 1904, 1902. The bearing face 1908 and the stop 1906 are perpendicular to and join the two parallel faces 1912.

The leg 104-B has a ledge 2002 that extends outward at the rail end of the leg 104-B. The ledge 2002 has a forward face 2010. The forward face 2010 of the ledge 2002 is at the proximal end of the leg 104-B. In the illustrated embodiment, the forward face 2010 is a planar surface in a plane perpendicular to the longitudinal axis of the leg 104-B. In various embodiments, the forward face 2010 is rounded or chamfered or another shape or at another angle that is readily insertable into the window 1802.

The ledge 2002 has a mating face 2008. The mating face 2008 is a planar surface along the top side of the ledge 2002. The mating face 2008 is parallel to the upper surface of the leg 104-B. The mating face 2008 is offset below the upper surface of the leg 104-B by approximately the thickness of the base wall 1902 of the rail 102-A. The transition between the upper surface of the leg 104-B and the ledge 2002 is defined by a shoulder 2006. The shoulder 2006 is a planar wall perpendicular to the mating face 2008.

The lower surface 2002 of the ledge 2008 is offset above the lower surface of the leg 104-B. The lower surface 2002 of the ledge 2008 extends from a slot 2004 to the forward face 2010 of the ledge 2008. The slot 2004 is defined by two parallel walls 2012, 2016 and an interior face 2014. One of the parallel walls 2012 extends upward into the leg 104-B from the lower surface of the leg 104-B. The other parallel wall 2016 extends upward into the leg 104-B from the lower surface of the ledge 2008. The interior face 2014 is a planar surface oriented perpendicular to the two parallel walls 2012, 2016.

The leg 104-B is removably attachable to the rail 102-A by inserting the ledge 2008 into the window 1802 and positioning the bearing face 1908 of the sidewall 1904 inside the slot 2004. The window 1802 in the rail 102-A interfaces with the proximal end of the leg 104-B to form a separable joint 1800.

The window 1802 is dimensioned and configured to receive the ledge 2002 and the slot 2004 of the leg 104-B. The leg 104-B is removably installed into the rail 102-A by inserting the ledge 2002 into the window 1802 at an angle to the upper surface of the rail 102-A. The ledge 2002 is inserted until the shoulder 2006 contacts the stop 1906. The distal end of the leg 104-B is then pivoted downward about the shoulder 2006 such that the slot 2004 receives the bearing face 1908 and corresponding side wall 1904. When installed, the mating face 2008 of the ledge 2002 contacts the inside face 1910 of the base wall 1902 of the rail 104-B and the bearing face 1908 of the window 1802 contacts the interior face 2014 of the slot 2004. The ledge 2002 is a length sufficient to fit into the window 1802 at a desired insertion angle without passing below the ends of the side walls 1904 where the rail 102-A rests on the ground.

In the illustrated embodiment, the rail 102-A is a channel. In another embodiment, the rail 102 has a rectangular cross-section and the window 1802 is a pocket formed inside the rail 102 with an inside face 1910 and an open space provided for the ledge 2002 to pivot into position. The length of the ledge 2002 is dimensioned and configured to fit into the window, or pocket, 1802 of the solid rail 102.

The illustrated embodiment of FIGS. 18 and 20 shows a leg 104-B configured to accept a slider 106. The leg 104-B has a pair of slots 702 on opposite sides that receive a corresponding tongue 602 of a slider 106. In another embodiment, the leg 104-B is slightly wider and without the slot 702. In such an embodiment, the peg 502 that supports the weave pole 108 is attached to the rail 102-A and the leg 104-B functions as a side support to the rail 102-A. Such an embodiment is suitable for use as a competition-ready agility device.

Figure 21:
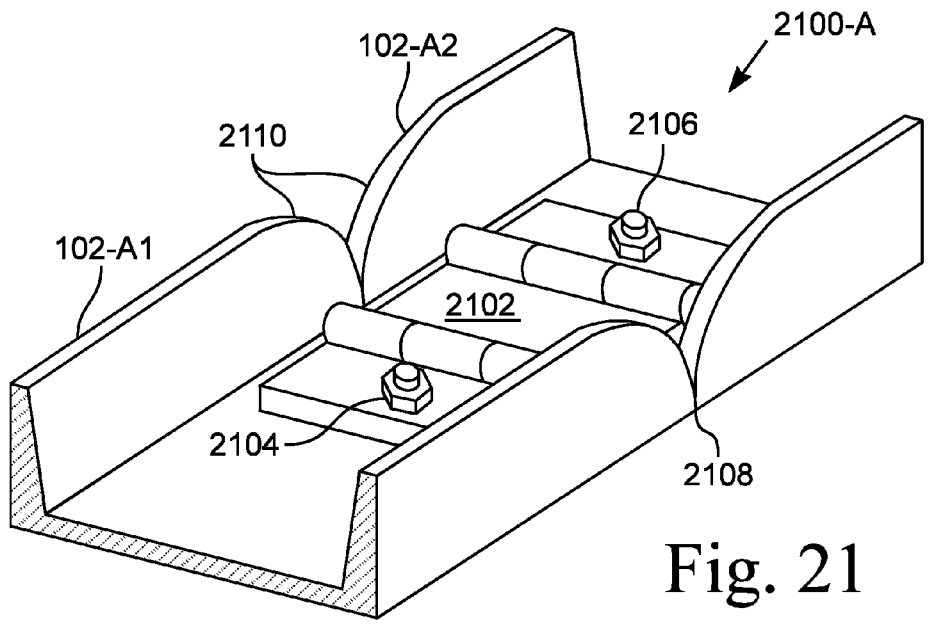
FIG. 21 is a partial perspective view of one embodiment of a connector between the rails of two weave trainers.

FIG. 21 illustrates a partial perspective view of one embodiment of a connector 2100-A between the rails 102-A1, 102-A2 of two weave trainers 100. The illustrated connector 2100-A includes a pair of rails 102-A1, 102-A2 with ends that butt together and a floating hinge 2102 that fits into the channel shaped rails 102-A1, 102-A2. The floating hinge 2102 provides for folding the rails 102-A1, 102-A2 over 180 degrees from a flat configuration with little or no gap 2108 between the parts. In the illustrated embodiment, the floating hinge 2102 is installed using threaded nuts 2104 and screws 2106. In other embodiments, the hinge is installed with other fastening devices, welds, or adhesives.

Figure 22:
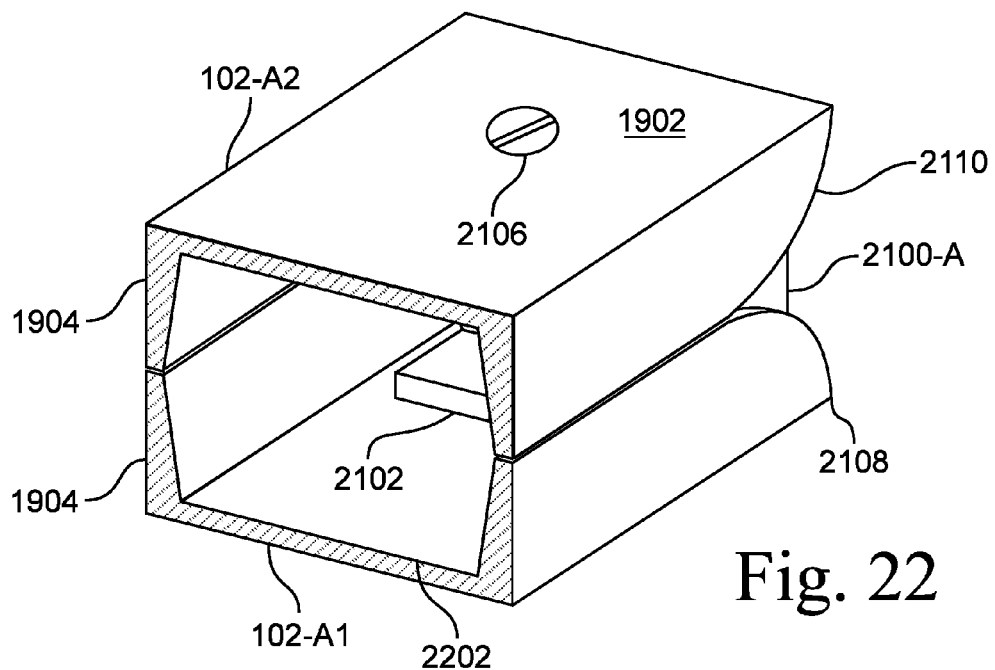
FIG. 22 is another partial perspective view of the connector shown in FIG. 21 in a folded configuration.

FIG. 22 illustrates another partial perspective view of the connector 2100-C shown in FIG. 21 in a folded configuration. When the two rails 102-A1, 102-A2 are folded together at 180 degrees from the flat configuration illustrated in FIG. 21 to the closed configuration illustrated in FIG. 22, a closed cavity 2202 is formed. The base walls 1902 form two sides of the cavity 2202 and the four side walls 1904 combine to form the other two walls of cavity 2202. The cavity 2202 provides for a storage location for the legs 104, sliders 106, or other components of the weave trainer 100.

In the illustrated embodiment, the ends 2110 of the rails 102-A1, 102-A2 are rounded. That is, the ends 2110 have a shape that allows the two rails 102-A1, 102-A2 to fold without binding. In other embodiments, the hinge 2102 is articulated such that rails 102-A1, 102-A2 with the square-cut ends do not bind when the rails 102-A1, 102-A2 are folded.

In another embodiment, the connector 2100-A is a solid bar instead of a hinge 2102. The solid bar rigidly attaches the two rails 102-A1, 102-A2 such that the rails 102-A1, 102-A2 move together as a single rigid rail 102-A.

Figure 23:
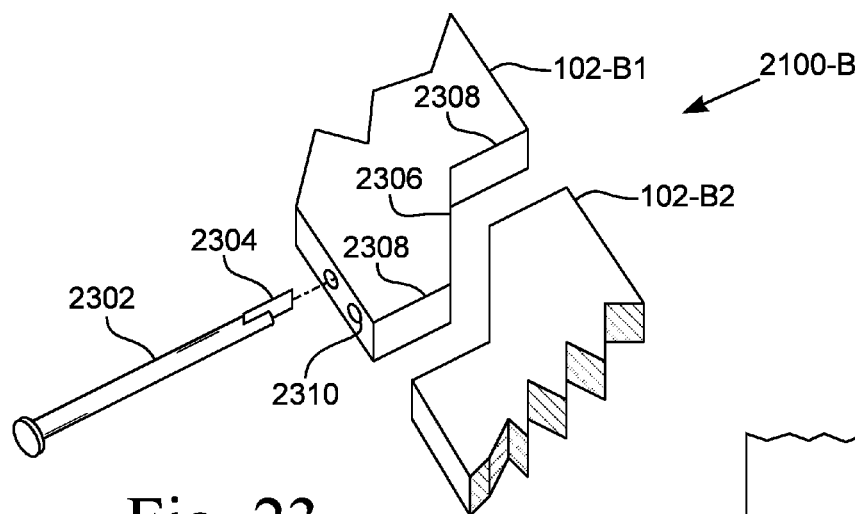
FIG. 23 is a partial perspective view of another embodiment of a connector between the rails of two weave trainers.
Figure 24:
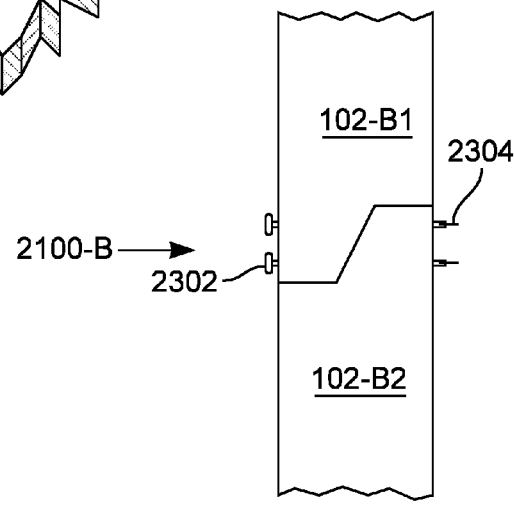
FIG. 24 is a top view of the connector shown in FIG. 23.

FIG. 23 illustrates a partial perspective view of another embodiment of a connector 2100-B between the rails 102-B1, 102-B2 of two weave trainers 100. FIG. 24 illustrates a top view of the connector 2100-B shown in FIG. 21. In one embodiment, two rails 102-B1, 102-B2 of a pair of weave trainers 100 are joined together at a connector 2100-B. The mating ends of the rails 102-B1, 102-B2 have complementary faces 2306, 2308 that mate when butted together. In the illustrated embodiment, each end has a pair of offset parallel faces 2308 that are connected with a third face 2306 near the rail centerline 110. In the illustrated embodiment, the third face 2306 is not parallel to the rail centerline 110. In another embodiment, the third face 2306 is parallel to the rail centerline 110.

When the rails 102-B1, 102-B2 are butted together, pins 2302 are inserted in corresponding holes 2310 in the rails 102-B1, 102-B2 to securely fix the rails 102-B1, 102-B2 together. In the illustrated embodiment, the pin 2302 has a toggle 2304 that rotates after passing through the hole 2310 to lock the pin 2302 in the rails 102. In other embodiments, cotter pins, clevis pins, detent pins, cotterless clevis pins, headless pins, or other fasteners are used to secure the rails 102 together.

Figure 25:
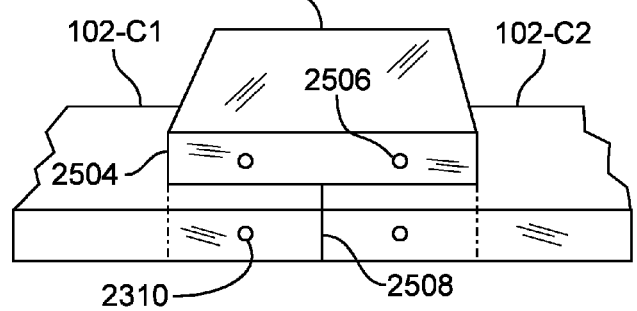
FIG. 25 is a partial side perspective view of another embodiment of a connector between the rails of two weave trainers.

FIG. 25 illustrates a partial side perspective view of another embodiment of a connector 2100-C between the rails 102-C1, 102-C2 of two weave trainers 100. The illustrated connector 2100-C includes a pair of rails 102-C1, 102-C2 with ends that butt together and a channel 2302 that fits over the ends of both rails 102-C1, 102-C2. The channel 2502 has a pair of sidewalls 2504 that fit adjacent the sides of the rails 102-C1, 102-C2. The sidewalls 2504 have holes 2506 that register with holes 2310 in the ends of the rails 102-C1, 102-C2 such that with the rails 102-C, 102-D butted together and the channel 2502 in position, pins 2302 fit in the holes 2506, 2310 to secure the rails 102-C, 102-D together.

Figure 26:
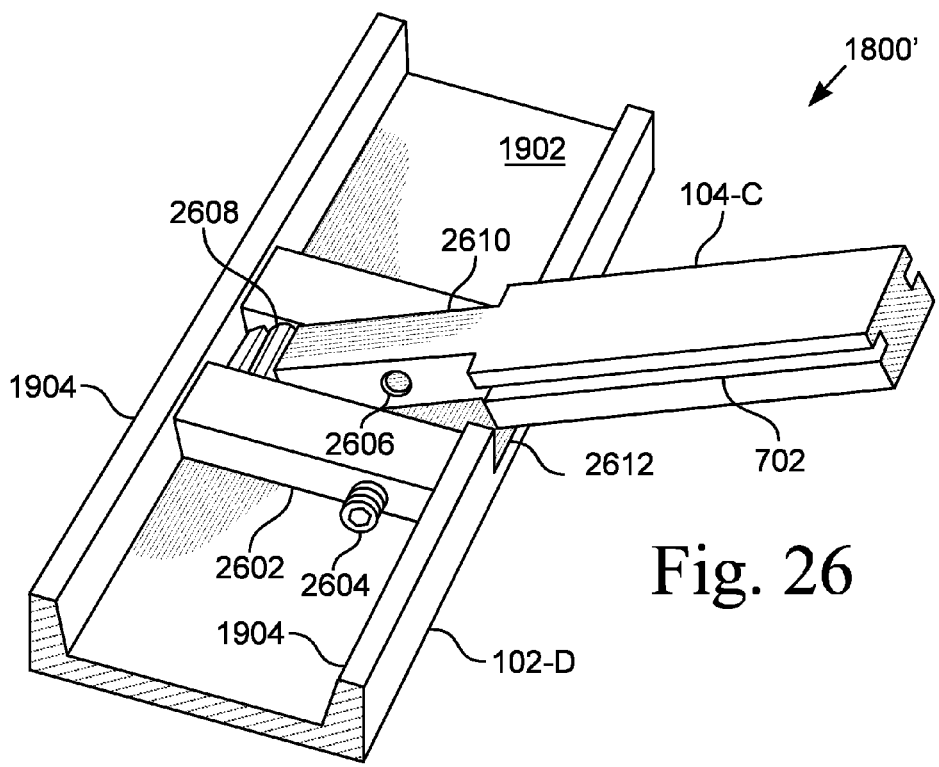
FIG. 26 is a partial perspective view of another embodiment of a joint between a rail and a leg.
Figure 27:
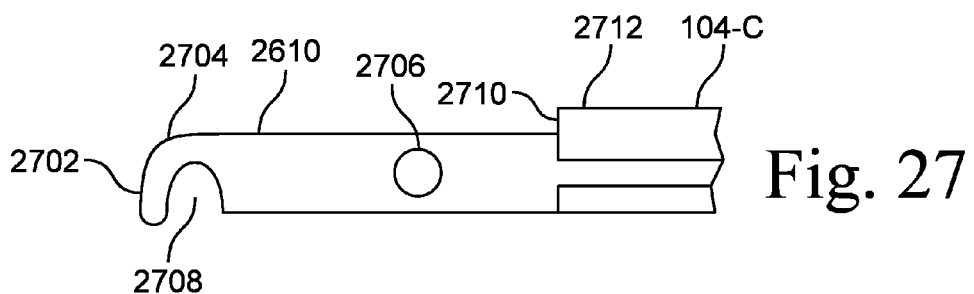
FIG. 27 is a partial side view of one embodiment of a leg.
Figure 28:
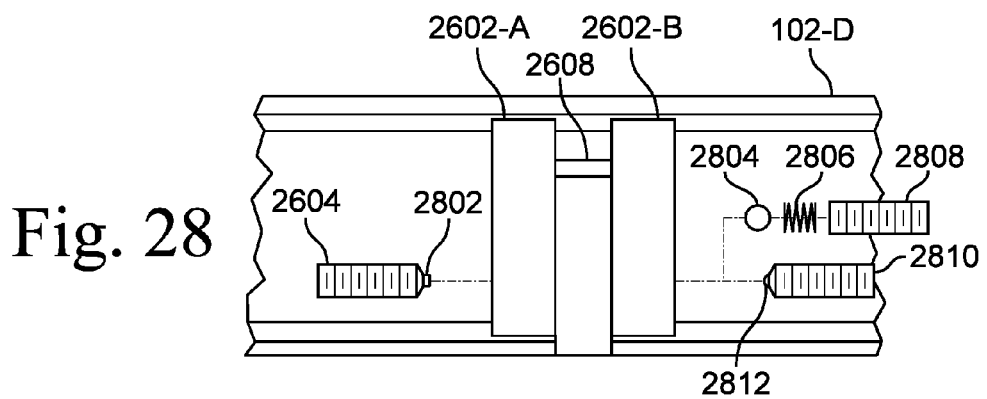
FIG. 28 is a bottom view of the rail shown in FIG. 26.

FIG. 26 illustrates a partial perspective view of another embodiment of a joint 1800' between a rail 102-D and a leg 104-C. FIG. 27 illustrates a partial side view of one embodiment of a leg 104-C. FIG. 28 illustrates a bottom view of the rail 102-D shown in FIG. 26.

The rail 102-D is a channel with a base wall 1902 and two side walls 1904. The rail 102-D has a notch 2612 in the side wall 1904 where the leg 104-C connects with the rail 102-D. In the illustrated embodiment, the notch 2612 in the side wall 1904 has a surface that is contiguous with the base wall 1902. The notch 2612 has a width sufficient to receive the latching portion 2610 of the leg 104-C.

Inside the rail 102-D and spanning the gap between the side walls 1904 are a pair of bars 2602. The bars 2602 are spaced apart sufficiently to receive the latching portion 2610 of the leg 104-C. Between the bars 2602 is a peg 2608. The peg 2608 engages a leg notch 2708 in the latching portion 2610. The distal end of the latching portion 2610 includes a hook 2702 and a rounded surface 2704. The hook 2702 holds the leg 104-C captive between the bars 2602 until the leg 104-C is positioned almost perpendicular to the base wall 1902, at which position the hook 2702 is slideable under the peg 2608. The rounded surface 2704 of the latching portion 2610 has a radius that permits the leg 104-D to pivot about the peg 2608. The leg 104-C has a deployed position in which the notch 2708 engages the peg 2608 and the ledge 2710 on the leg 104-C is adjacent one side wall 1904 and the upper surface 2712 of the leg 104-C is substantially parallel with the upper surface of the rail 102-D. The leg 104-C has a second position in which the leg 104-C is not latched in the rail 102-D and the leg 104-C is readily removable from the rail 102-D.

The illustrated embodiment of the joint 1800' includes a detent mechanism that includes a recess 2706 in the latching portion 2610 of the leg 104-C. In one embodiment of the detent mechanism, engaging the recess 2706 is a springloaded detent ball setscrew 2810 that has a captive ball 2812. In another embodiment, engaging the recess 2706 is a ball 2804 that is biased by a spring 2806 with a setscrew 2808 capturing the ball 2804 and spring 2806 in a threaded opening in the bar 2602-B. In such an embodiment, the threaded opening has a restriction that prevents the ball 2804 from escaping the threaded opening when the latching portion 2610 of the leg 104-D is not adjacent the threaded opening. The detent mechanism operates to latch the leg 104-C in the deployed position by the ball 2812, 2804 engaging the recess 2706. The bias on the ball 2812, 2804 is sufficient to secure the leg 104-C to the rail 102-D with the leg 104-C and the latching portion 2610 in the deployed position.

In one embodiment a locking mechanism is provided when it is desired to lock the leg 104-C in the deployed position. The locking mechanism includes a setscrew 2604 that passes through a bar 2602-A and engages a locking recess 2606 in the latching portion 2610 of the leg 104-C. In one embodiment, the locking setscrew 2604 has a blunt nose 2802 that engages the locking recess 2606. In one such embodiment, the locking recess 2606 has a truncated conical configuration and the blunt nose 2802 engages the conical walls of the locking recess 2606, thereby positioning the leg 104-C before locking it into the deployed position.

In one embodiment, the legs 104-C have a width that is dimensioned to fill one-half of the inside width of the rail 102-D. In this way, two legs 104-C are storable side-by-side between the side walls 1902 of the rail 102-D. In this way the legs 104-C are easily transported and stored with the rail 102-D.

The illustrated embodiment of FIGS. 26 and 27 shows a leg 104-C configured to accept a slider 106. The leg 104-C has a pair of slots 702 on opposite sides that receive a corresponding tongue 602 of a slider 106. In another embodiment, the leg 104-C is slightly wider and without the slot 702. In such an embodiment, the peg 502 that supports the weave pole 108 is attached to the rail 102-D and the leg 104-C functions as a side support to the rail 102-D. Such an embodiment is suitable for use as a competition-ready agility device.

Figure 29:
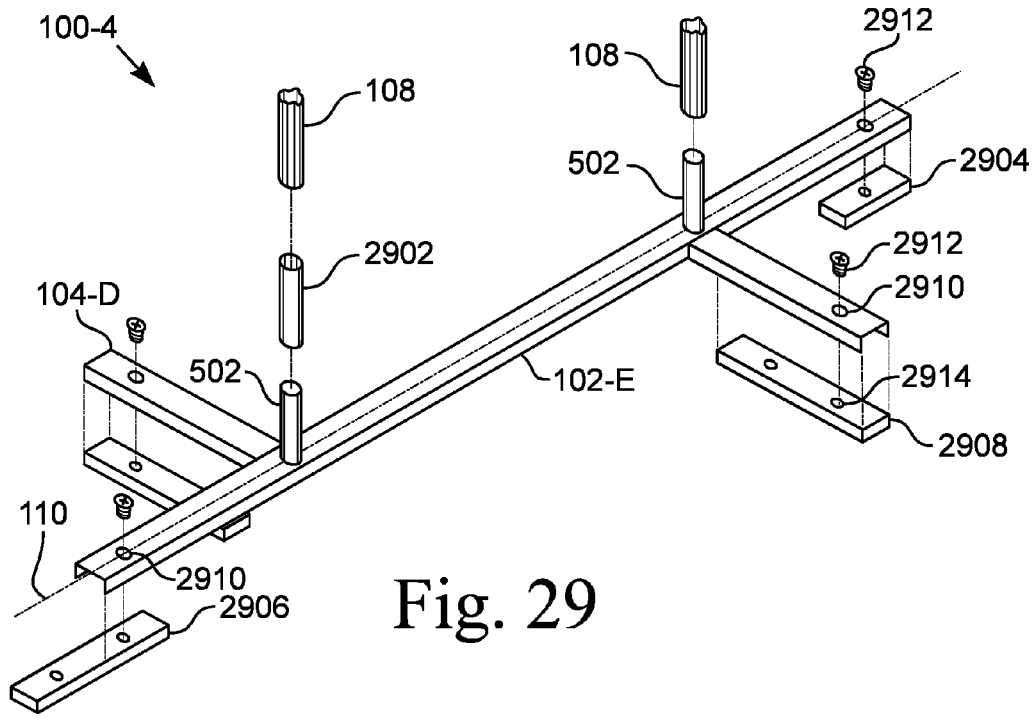
FIG. 29 is an exploded perspective view of one embodiment of a competition centerline weave device.

FIG. 29 illustrates an exploded perspective view of one embodiment of a competition centerline weave device 100-4. The centerline weave device 100-4 includes a rail 102-E with a pair of opposing legs 104-D. The rail 102-E is a longitudinal channel with a longitudinal axis 110. Each leg 104-D is attached to an opposite side of the rail 102-E. In one embodiment, the legs 104-D are welded to the rail 102-E. The centerlines of each leg 104-D are twenty-four inches apart and the centerline of each leg 104-D is twelve inches from the nearest end of the rail 102-E.

The rail 102-E and the legs 104-D are channels. A channel is a structural member with a C-shape cross-section, that is, it is a web with a pair of parallel sides protruding from the same side of the web. In one embodiment, the channels are one-eighth inch thick sheet metal formed with half-inch sides and an inch-and-one-half wide top. The outside end of the rail 102-E includes an end block 2904. The end block 2904 closes the open end of the rail 102-E to avoid injury or other happenstance from the open end of the rail 102-E. The end block 2904 is attached to the rail with a fastener 2912 that engages a threaded opening in the block 2904. The fastener 2912 has a low exposed profile, such as found with an oval head screw. In this way the exposed top of the fastener 2912 presents a minimal hazard to the animal 202. In various embodiments, the end block 2904 is made of plastic when additional weight is not needed or is made of a metal or other weighty material when additional weight is desired to hold the centerline weave device 100 on the ground.

The opposite end of the rail 102-E receives a connector 2906 that has a pair of threaded holes 2914. A fastener 2912 engages the threaded hole in the connector 2906 to attach the connector 2906 to the rail 102-E. When it is desired to have a centerline weave of regulation length, several centerline weave devices 100-4 must be strung together, end to end. The connector 2906 attaches the end of one rail 102-E to another rail 102-E with half of the connector 2906 extending past the end of the rail 102-E. In various embodiments, the connector 2906 is made of plastic, when additional weight is not needed, or is made of a metal or other weighty material when additional weight is desired to hold the centerline weave device 100 on the ground.

In one embodiment, each leg 104-D receives a weight 2908 that allows the device 100-4 to have increased stability. In one embodiment, the weight 2908 is the same as the connector 2906, which reduces the number of unique parts required for the device 100-4. Each weight 2908 includes at least one threaded hole 2914 that receives a fastener 2912 to secure the weight 2918 inside the channel of the leg 104-D.

Proximate each leg 104-E is a peg 502 extending perpendicular to the longitudinal axis 110 and from the center of the top of the rail 102-E. In one embodiment the peg 502 is welded to the rail 102-E. The peg 502, in one embodiment, has a cylindrical diameter sized to receive a weave pole 108 with minimal play while allowing the weave pole 108 to be removed from the peg 502 by pulling the pole 108 up in the direction of the cylindrical axis. In another embodiment, a resilient sleeve 2902 fits over the peg 502 and the weave pole 108 has a sliding engagement with the peg 502 and sleeve 2902. In one such embodiment, the sleeve 2902 is a section of tubing shrunk over the peg 502, for example, the sleeve 2902 is heat shrink tubing. The sleeve 2902 minimizes rattling of the weave pole 108 over the peg 502 when the pole 108 is struck, such as happens when an animal traverses the centerline weave device 100.

Figure 30:
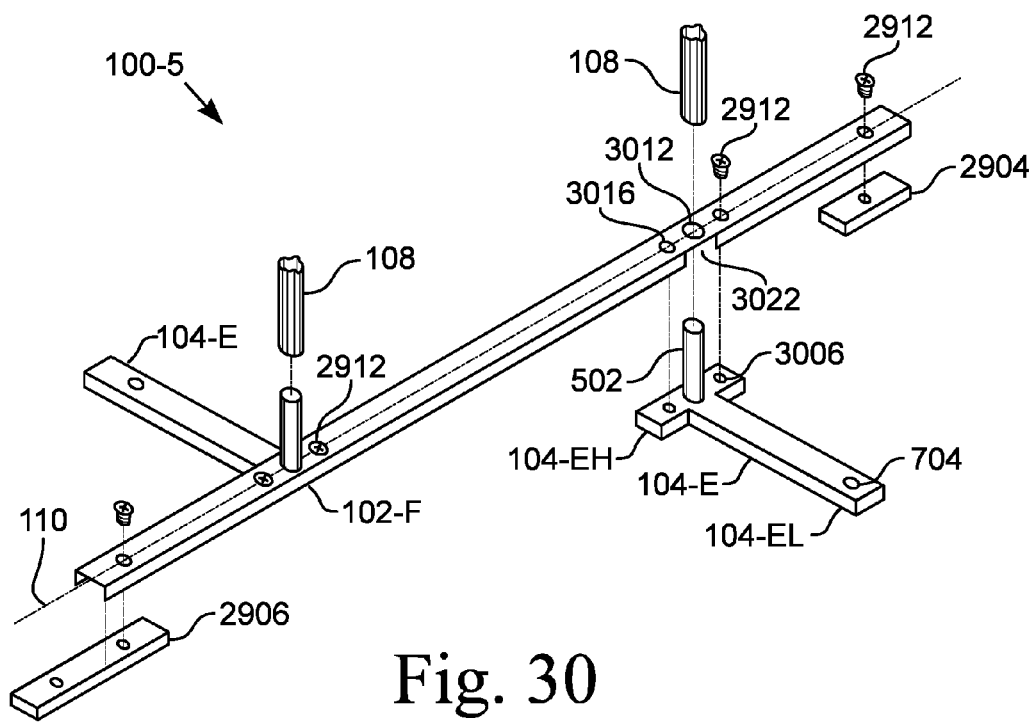
FIG. 30 is an exploded perspective view of one embodiment of a multiuse centerline weave device showing a pair of competition legs.
Figure 31:
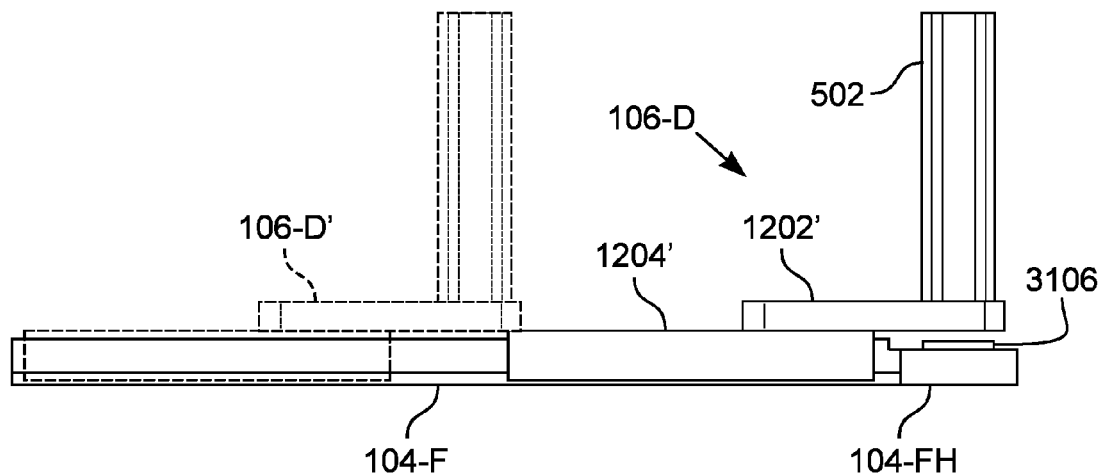
FIG. 31 is a side view of a slider leg with a fixed peg slider shown in two positions.
Figure 32:
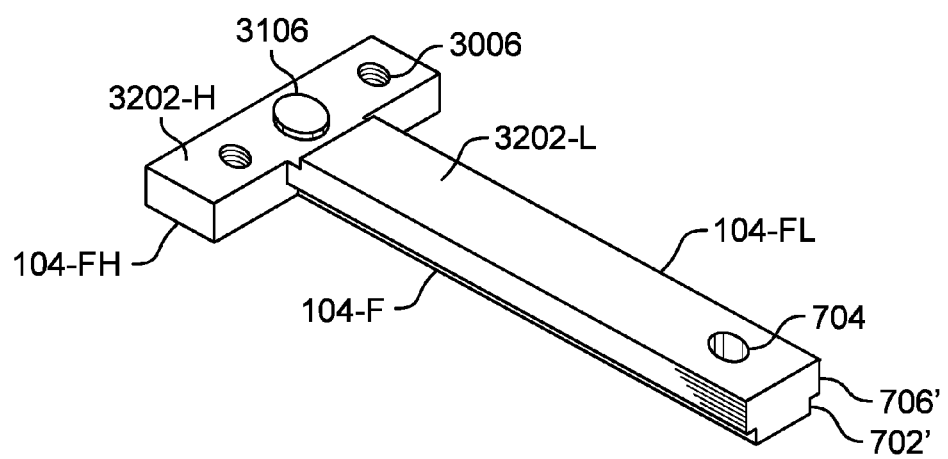
FIG. 32 is a perspective view of one embodiment of a slider leg.
Figure 33:
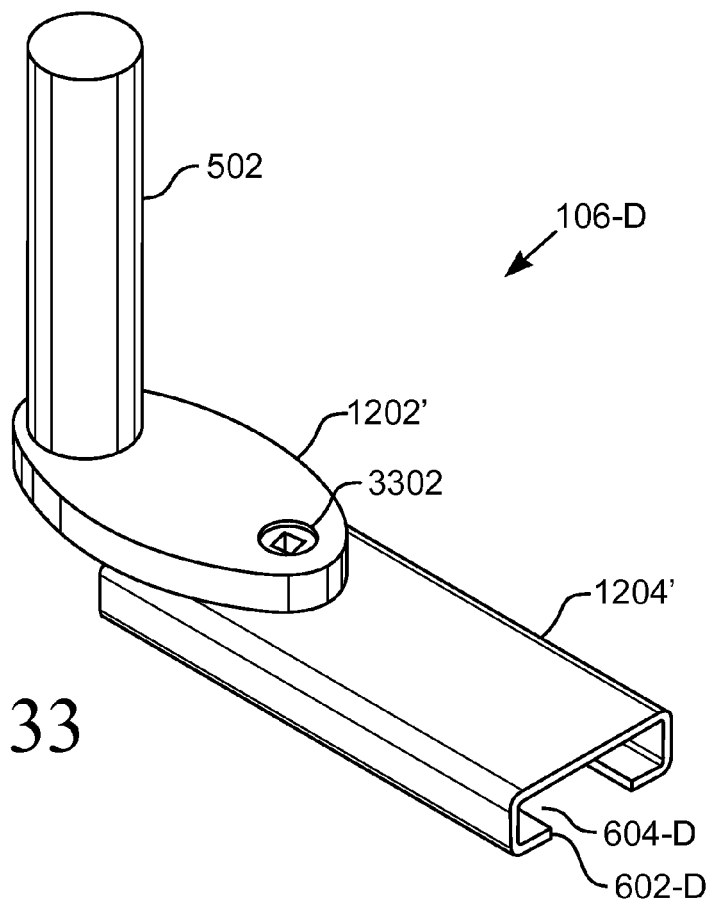
FIG. 33 is a perspective view of one embodiment of a fixed peg slider.
Figure 34:
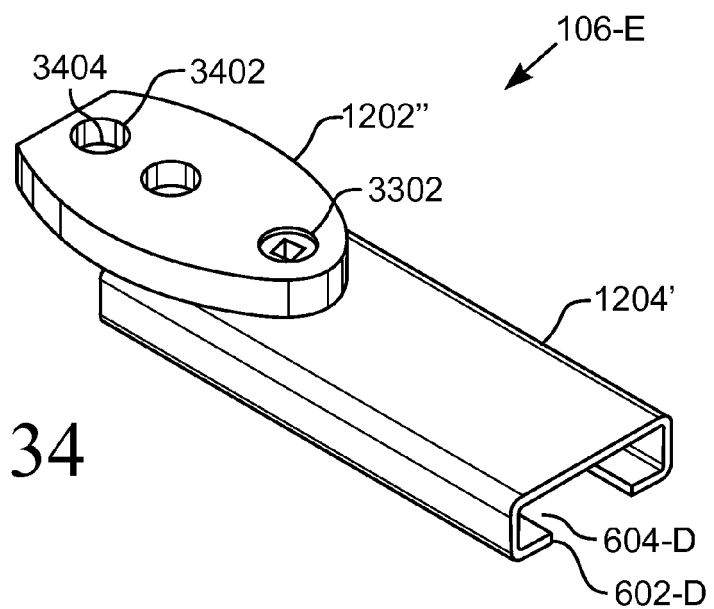
FIG. 34 is a perspective view of one embodiment of a slider for a tilting mechanism.
Figure 35:
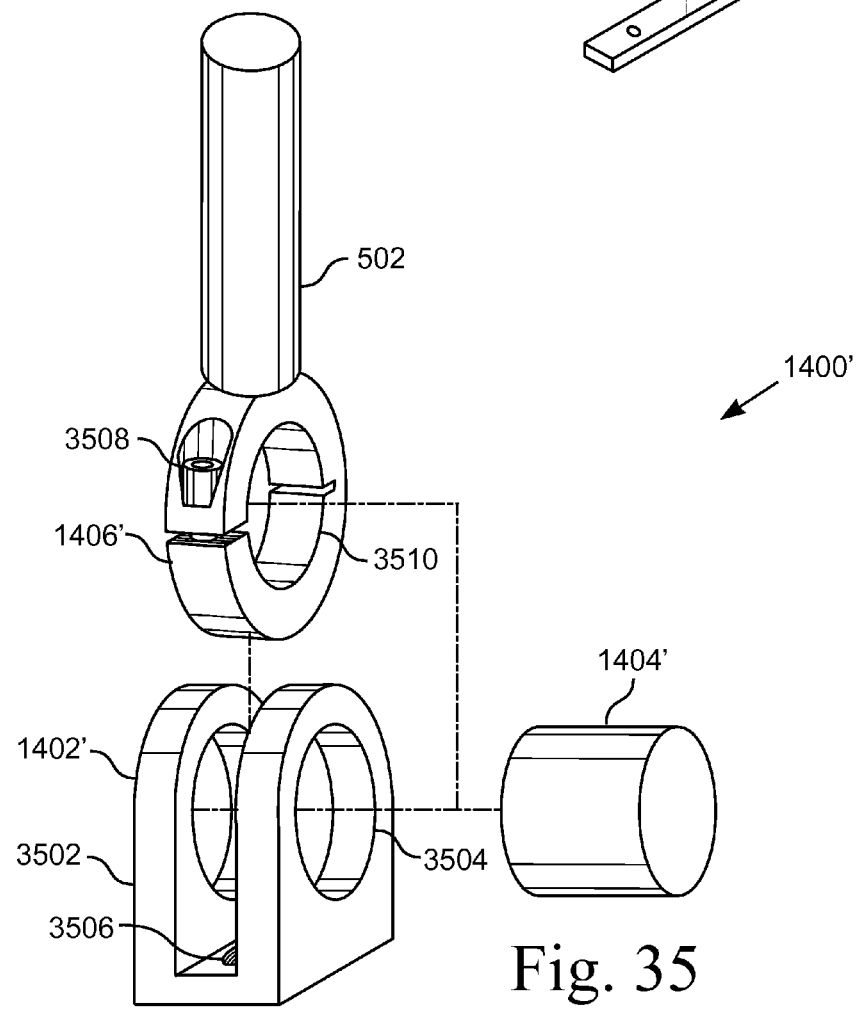
FIG. 35 is an exploded oblique view of another embodiment of a tilting mechanism.

FIG. 30 illustrates an exploded perspective view of one embodiment of a multiuse centerline weave device 100-5 showing a pair of competition legs 104-E. The multiuse device 100-5 includes a rail 102-F, similar to that shown in FIG. 31, that has features for receiving interchangeable legs, such as the illustrated competition legs 104-E or the slider legs 104-F illustrated in FIG. 32. The rail 102-F includes two spaced apart attachment portions configured such that each one of the pair of interchangeable legs extends from opposite sides of the rail 102-F. The figures illustrate three sets of interchangeable legs. The first set of interchangeable legs are the competition legs 104-E shown in FIG. 30. The second set of interchangeable legs include the slider legs 104-F with sliders 106-D each having an upright peg 502 such as shown in FIGS. 31-33. The third set of interchangeable legs include the slider legs 104-F with sliders 106-E each having a tilting mechanism 1400' such as shown in FIGS. 32, 34, and 35.

The rail 102-F is a longitudinal channel with a longitudinal axis 110. Each leg 104-E is attached to an opposite side of the rail 102-F. In one embodiment, the centerlines of each leg 104-E are twenty-four inches apart and the centerline of each leg 104-E is 12 inches from the nearest end of the rail 102-F.

The rail 102-F is a channel, similar to the rail 102-E illustrated in FIG. 29. The rail 102-F includes two spaced apart, opposing attachment portions. Each attachment portion is defined by at least one opening 3012 and one slot 3022. Each attachment portion in the illustrated embodiment has three openings 3016, 3012 in the top surface of the rail 102-F and an opening or slot 3022 in one side of the rail 102-F. The slot 3022 for one attachment portion is on the opposite side of the rail 102-F as the slot 3022 for the other attachment portion.

The competition leg 104-E has a head 104-EH and a leg portion 104-EL extending therefrom. The head 104-EH has two threaded holes 3006 and a peg 502. The head 104-EH fits inside the rail 102-F between the two sidewalls of the rail 102-F. The peg 502 engages the center opening 3012 in the rail 102-F and the leg portion 104-EL engages the side opening 3022. The threaded holes 3006 in the head 104-EH align with the holes 3016 in the top surface of the rail 104-F, and fasteners 2912 secure the head 104-EH to the rail 102-F. The leg portion 104-EL includes an opening 704 at its distal end. The opening 704 is for inserting a stake to secure the device 100-5 to the ground during use.

FIG. 31 illustrates a side view of a slider leg 104-F with a fixed peg slider 106-D shown in two positions. The slider 106-D includes a peg 502 attached to a slider plate 1202', which is attached to a slider channel 1204'. The first position of the fixed peg slider 106-D shows the peg 502 positioned above the plug 3106 on the slider head 104-FH. The plug 3106 fits into the opening 3012 in the rail 102-F. In this position, the peg 502 is positioned over the centrally aligned longitudinal axis 110 of the rail 102-F.

The second position is shown in phantom and has the fixed peg slider 106-D' moved toward the distal end of the slider leg 104-F. The second position, and the positions between the first and second positions, allow the weave poles 108 to be adjusted for training the animal 202 to traverse the centerline weave device 100-5 using various training methods.

FIG. 32 illustrates a perspective view of one embodiment of a slider leg 104-F. The slider leg 104-F has a T-shape with a head 104-FH and a leg portion 104-FL extending therefrom. The head 104-FH has two threaded holes 3006 and a plug 3106 extending upwards that fits into the opening 3022 in the rail 102-F. The plug 3106 has a top surface that is flush with the top surface of the rail 102-F, thereby eliminating any uneven surface on the rail 104-F that could provide a hazard for the animal 202 traversing the weave device 100-5.

The leg portion 104-FL has an upper surface 3202-L that is elevated relative to the upper surface 3202-H of the head 104-FH and substantially flush with the top surface of the plug 3106. The upper surface 3202-L of the leg portion 104-FL is flush with the top surface of the rail 102-F, thereby aiding in the movement of the slider 106-D, 106-E and eliminating any uneven surface on the rail 104-F that could provide a hazard for an animal traversing the weave device 100-5. The height or thickness of the leg portion 104-FL is the same as the height of the rail 102-F.

Each lateral side of the leg portion 104-FL has a lip, or ledge, 706' with a slot or recess 702' under the ledge 706'. The pair of ledges 706' are received by the groove, or slot, 604-D in the slider 106-D, 106-E.

In one embodiment, the edges and/or corners of the slider leg 104-F are rounded or chamfered to avoid sharp edges and to better mate with the rail 102-F. This is also true for the competition legs 104-E shown in FIG. 30.

FIG. 33 illustrates a perspective view of one embodiment of a fixed peg slider 106-D. The slider 106-D and the slider leg 104-F form a second leg assembly such as illustrated in FIG. 31. The slider 106-D includes a peg 502 attached to a slider plate 1202', which is attached to a slider channel 1204'. The proximal end of the slider 106-D is contoured to minimize the surface of the slider 106-D that is exposed when the weave pole 108 is placed over the peg 502. By minimizing the exposure of the slider 106-D at the proximal end, there is less likelihood that the animal 202 will step on or otherwise be affected by the slider 106-D.

The slider channel 1204' is attached to the slider plate 1202' and extends away from the end with the peg 502. The slider channel 1204' includes a groove or recess 604-D that is bounded by a lip or tongue 602-D on the bottom. Each groove 604-D is defined by the top of the slider channel 1204', a sidewall, and a lip 602-D. The slider channel 1204' is dimensioned such that the pair of opposing grooves 604-D receive the opposing ledges 706' of the leg portion 104-FL of the slider leg 104-F with a sliding fit. The slider channel 1204' is captive on the leg portion 104-FL with the exception of the distal end of the leg portion 104-FL, where the slider channel 1204' is able to slide off and be removed from the leg portion 104-FL.

The slider plate 1202' includes a set screw 3302 that fits in a threaded hole in the plate 1202'. The set screw 3302 protrudes through the slider plate 1202' and the slider channel 1204', where the tip of the set screw 3302 engages the top surface 3202-L of the slider leg 104-F, thereby locking the slider 106-D in position. Screwing the set screw 3302 into the slider plate 1202' forces the distal tip of the set screw 3302 against the leg portion 104-FL of the slider leg 104-F, which forces the bottom of the ledge 706' against the lip 602-D, thereby inhibiting movement of the slider 106-D along the leg portion 104-FL.

FIG. 34 illustrates a perspective view of one embodiment of a slider 106-E for a tilting mechanism 1400'. The slider 106-E with the tilting mechanism 1400', when combined with the slider leg 104-F, form a third leg assembly. The slider 106-E includes a slider plate 1202" that is attached to a slider channel 1204'. The slider plate 1202" includes a pair of holes 3402 that coincide with the threaded holes in the tilting mechanism 1400'. The holes 3402 are countersunk 3404 such that fasteners inserted from the bottom engage the tilting mechanism 1400'. The countersunk holes 3402 ensure that there are no protrusions under the slider plate 1202" to interfere with sliding of the slider 106-E over the rail 102-F.

The slider plate 1202" includes a set screw 3302 that fits in a threaded hole in the plate 1202". The set screw 3302 protrudes through the slider plate 1202" and the slider channel 1204', where the tip of the set screw 3302 engages the top surface 3202-L of the slider leg 104-F, thereby locking the slider 106-E in position. Screwing the set screw 3302 into the slider plate 1202" forces the distal tip of the set screw 3302 against the leg portion 104-FL of the slider leg 104-F, which forces the bottom of the ledge 706' against the lip 602-D, thereby inhibiting movement of the slider 106-E along the leg portion 104-FL.

FIG. 35 illustrates an exploded oblique view of another embodiment of a tilting mechanism 1400'. In one embodiment, the tilting mechanism 1400' attaches to the slider 106-E. In another embodiment, the tilting mechanism 1400' is configured to attach to the slider channel 1204. In yet another embodiment, the tilting mechanism 1400' is configured to attach to the top of the rail 102-G.

The tilting mechanism 1400' includes a collar support 3502, a collar 1406', and an axel 1404'. The collar support 3502 includes two bearing walls 1402' that are parallel with a gap between them sized to receive the collar 1406'. The bearing walls 1402' each have an opening 3504 sized to receive the axel 1404'.

The base of the collar support 3502 includes a pair of threaded holes 3506 that are configured to mate with the holes 3402 in the slider plate 1202" of the slider 106-E. In another embodiment of the device 100-6, the tilting mechanism 1400' attaches directly to the rail 102, such as illustrated in FIG. 36.

In the illustrated embodiment, the collar 1406' is a split ring clamp. The collar 1406' has a central opening 3510 that receives the axel 1404'. The screw 3508 draws the open end of the collar 1406' together, thereby clamping the collar 1406' to the axel 1404'. Attached to the collar 1406' is a peg 502, which is oriented with its cylindrical axis perpendicular to the axis of the axel 1404'. In one embodiment the peg 502 is attached to the collar 1406' by a welded connection. In the illustrated embodiment, the cylindrical axis of the peg 502 is substantially parallel to the axis of the screw 3508. In another embodiment, the cylindrical axis of the peg 502 is offset relative to the axis of the screw 3508, such as by an angle of 45 degrees, to allow the screw 3508 to be adjusted with a wrench having clearance to rotate without striking the peg 502 or a weave pole 108 on the peg 502.

Figure 36:
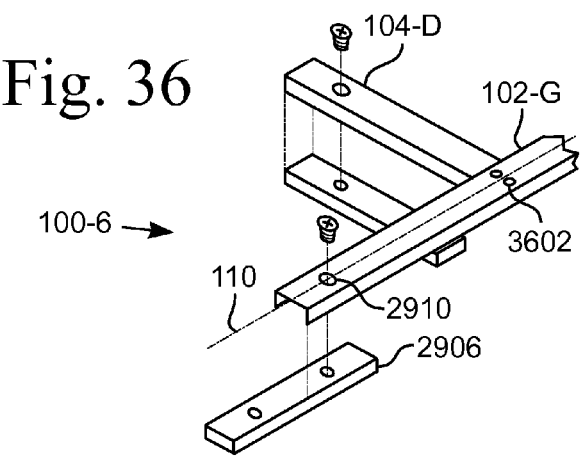
FIG. 36 is a partial exploded view of another embodiment of a centerline weave device configured to receive a tilting mechanism.

FIG. 36 illustrates a partial exploded view of another embodiment of a centerline weave device 100-6 configured to receive a tilting mechanism 1400'. The illustrated centerline weave device 100-6 is similar to that illustrated in FIG. 29 except that there are no fixed pegs 502 attached to the rail 102-G. The illustrated rail 102-G includes two holes 3602 aligned with the centerline of the leg 104-D and transverse to the longitudinal axis 110 to the rail 102-G. The holes 3602 coincide with the threaded holes 3506 on the bottom of the collar support 3502.

The tilting mechanism 1400' is secured to the rail 102-G through those holes 3602 by fasteners inserted from the bottom of the rail 102-G. In this way, the weave pole 108 originates at the centerline of the rail 102-G and is adjustable through a plane perpendicular to the longitudinal axis 110 of the rail 102-G.

The multiuse centerline weave device 100-5 includes various functions. The function of providing a visual aid to an animal 202 traversing a series of poles 108 is implemented, in one embodiment, by the rail 102, which remains in place throughout the various positions of the poles 108.

The function of providing interchangeable legs is implemented, in one embodiment, by two legs 104-E, 104-F. In one embodiment, the slider legs 104-F receive interchangeable sliders 106-D, 106-E to make two different sets of interchangeable legs.

The function of moving the weave pole 108 transversely relative to the rail 102-F is implemented, in one embodiment, by the sliders 106-D, 106-E slideably engaging the slider leg 104-F.

The function of locking the slider 106-D, 106-E in position relative to the slider leg 104-F is implemented, in one embodiment, by a set screw 3302 threaded in the slider plate 1202', 1202" that engages the top surface 3202-L of the slider leg 104-F.

The function of locking the collar or rotating member 1406' is implemented, in one embodiment, by the fastener 3508 that squeezes the collar 1406', thereby clamping the collar 1406' to the axel 1404', such as illustrated in FIG. 35. Another embodiment is illustrated in FIG. 14, which shows a stud 1410 extending from the peg 502' with a distal end of the stud 1410 contacting the axel 1404, such as illustrated in FIGS. 14 and 15.

From the foregoing description, it will be recognized by those skilled in the art that a multiuse centerline weave device 100-5 has been provided. In one embodiment, the weave trainer 100 includes a plurality of sets of legs 104-E, 104-F that extend from a rail 102-F. One set of legs 104-E are suitable for use during competition or competition-like training. Another set of legs 104-F receive sliders 106-D, 106-E that have an upright peg 502 and a titling peg 502, respectively.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for a multiuse centerline weave device, said apparatus comprising:

a rail being an elongated channel having a top, a first side, and a second side, said rail having a rail longitudinal axis;

a first leg releasably attachable to said rail, said first leg having a head and a leg portion extending from said head, said head dimensioned and configured to be received between said first and second sides of said rail with said leg portion extending through a first slot in said first side of said rail, said head of said first leg configured to be secured to said top of said rail by a fastener penetrating an opening in said rail, said leg portion having a pair of notches extending along the lower sides;

a first slider configured to engage said leg portion of said first leg with a sliding fit along a longitudinal axis of said leg portion, said first slider having a first slider channel with a pair of opposed grooves each defined by a slider channel top, a sidewall, and a lip opposite said slider channel top, each one of said pair of opposed grooves receiving a corresponding one of said pair of notches on said leg portion of said first leg, said first slider having a first slider plate attached to said first slider channel, said first slider plate extending beyond said first slider channel whereby said first slider plate is movable to a first position where said first slider plate extends above said top of said rail when said first leg is attached to said rail;

a first peg extending from said first slider plate attached to said first slider;

a first weave pole having an open end, said open end of said first weave pole configured to receive said first peg;

a second leg releasably attachable to said rail, said second leg having a head and a leg portion extending from said head, said head dimensioned and configured to be received between said first and second sides of said rail with said leg portion extending through second a slot in said second side of said rail, said head of said second leg configured to be secured to said top of said rail by a fastener penetrating an opening in said rail, said leg portion having a pair of notches extending along the lower sides;

a second slider configured to engage said leg portion of said second leg with a sliding fit along a longitudinal axis of said leg portion, said second slider having a second slider channel with a pair of opposed grooves each defined by a slider channel top, a sidewall, and a lip opposite said slider channel top, each one of said pair of opposed grooves receiving a corresponding one of said pair of notches on said leg portion of said second leg, said second slider having a second slider plate attached to said second slider channel, said second slider plate extending beyond said second slider channel whereby said second slider plate is movable to a first position where said second slider plate extends above said top of said rail when said second leg is attached to said rail;

a second peg extending from said second slider plate attached to said second slider; and a second weave pole having an open end, said open end of said second weave pole configured to receive said second peg.

2. The apparatus of claim 1 further including a first tilt mechanism between said first slider plate attached to said first slider and said first peg, and a second tilt mechanism between said second slider plate attached to said second slider and said second peg.

3. The apparatus of claim 2 wherein said first and second tilt mechanisms each include a collar that clamps to an axel when a screw is tightened.

4. The apparatus of claim 1 wherein said head portion of said first and second legs each have a plug configured to engage a corresponding peg opening in said top of said rail, and each said plug having a top surface substantially flush with a top surface of said top of rail when said first and second legs are attached to said rail.

5. The apparatus of claim 1 wherein said leg portion of said first and second legs each have a top surface that is substantially coplanar with a top surface of said top of rail when said first and second legs are attached to said rail.

6. The apparatus of claim 1 further including a third leg, a third peg, a fourth leg, and a fourth peg, each of said third and fourth legs releasably attachable to said rail, each of said third and fourth legs having a head and a leg portion extending from said head, said head dimensioned and configured to be received between said first and second sides of said rail with said leg portion extending through one of said first and second slots in said rail, said head of each of said third and fourth legs configured to be secured to said top of said rail by a fastener penetrating an opening in said rail, each of said third and fourth pegs extending through a corresponding peg opening in said top of said rail.

7. The apparatus of claim 1 wherein said first slider plate includes a first set screw that engages said leg portion of said first leg to lock said first slider to said first leg; and said second slider plate includes a second set screw that engages said leg portion of said second leg to lock said second slider to said second leg.

8. The apparatus of claim 1 wherein said rail is a first rail configured to attach to a second rail, and further including a connector dimensioned and configured to attach to a distal end of said first rail between said first and second sides, said connector having a distal end extending from said distal end of said first rail such that said second rail is attachable to said connector.

9. An apparatus for a multiuse centerline weave device, said apparatus comprising:

a rail being an elongated channel having a top, a first side, and a second side, said rail having a rail longitudinal axis, said rail having a first attachment portion and a second attachment portion spaced apart from said first attachment portion along said rail longitudinal axis, said first attachment portion defined by a first opening in said top of said rail and a first slot in said first side of said rail, said second attachment portion defined by a second opening in said top of said rail and a second slot in said second side of said rail;

a first pair of legs releasably attachable to said rail at said first attachment portion, each one of said first pair of legs including a first peg attached to a head, each said head of said first pair of legs configured to fit between said first and second sides of said rail with each said first peg extending through a corresponding one of said first and second openings in said top of said rail, each one of said first pegs dimensioned and configured to be received by an open end of a weave pole; and a second set of legs releasably attachable to said rail at said second attachment portion, each one of said second pair of legs including a head configured to fit between said first and second sides of said rail with a plug extending through a corresponding one of said first and second openings in said top of said rail with each said plug having a top surface flush with a top surface of said top of said rail, each one of said second pair of legs including a slider configured to move along a longitudinal axis of a corresponding one of said second pair of legs, each one of said sliders having a second peg dimensioned and configured to be received by an open end of said weave pole, each one of said sliders configured to move between a first position and a second position, and said first position having said second peg located above said rail longitudinal axis.

10. The apparatus of claim 9 wherein said second set of legs further include a tilt mechanism for each one of said pair of legs, each one of said tilt mechanisms positioned between a slider plate of each said slider and a corresponding one of said slider pegs.

11. The apparatus of claim 9 wherein a leg portion of each one of said second set of legs has a top surface that is substantially coplanar with a top surface of said top of rail when said second set of legs are attached to said rail.

12. The apparatus of claim 9 further including a block dimensioned and configured to attach to a distal end of said rail between said first and second sides, said block having a distal end flush with said distal end of said rail.

13. The apparatus of claim 9 wherein said rail is a first rail configured to attach to a second rail, and further including a connector dimensioned and configured to attach to a distal end of said first rail between said first and second sides, said connector having a distal end extending from said distal end of said first rail such that said second rail is attachable to said connector, said connector having a pair of threaded openings, a first one of said pair of threaded openings receiving a first fastener passing through a connector opening in said first rail, and a second one of said pair of threaded openings configured to receive a second fastener passing through a connector opening in said second rail.

14. An apparatus for a multiuse centerline weave device, said apparatus comprising:

a rail being an elongated channel having a top, a first side, and a second side, said rail having a rail longitudinal axis, said rail having a first end and a second end, said rail having a first attachment portion and a second attachment portion spaced apart from said first attachment portion along said rail longitudinal axis, said first attachment portion defined by a first opening in said top of said rail and a first slot in said first side of said rail, and said second attachment portion defined by a second opening in said top of said rail and a second slot in said second side of said rail;

a first leg releasably attachable to said rail at said first attachment portion, said first leg having a first head and a first leg portion, said first head dimensioned and configured to fit between said first and second sides of said rail under said top of said rail, said first leg portion dimensioned and configured to extend through said first slot and parallel to said top of said rail;

a first peg associated with said first leg, said first peg dimensioned and configured to be received by a first weave pole;

a second leg releasably attachable to said rail at said second attachment portion, said second leg having a second head and a second leg portion, said second head dimensioned and configured to fit between said first and second sides of said rail under said top of said rail, said second leg portion dimensioned and configured to extend through said second slot and parallel to said top of said rail; and a second peg associated with said second leg, said second peg dimensioned and configured to be received by a second weave pole.

15. The apparatus of claim 14 wherein said first peg extends from said first head, said first peg dimensioned and configured to extend through said first opening in said first attachment portion; and wherein said second peg extends from said second head, said second peg dimensioned and configured to extend through said second opening in said second attachment portion.

16. The apparatus of claim 14 further including a first slider and a second slider, said first slider including a first slider plate with said first peg attached thereto, said first slider movable longitudinally along said first leg portion between a first position and a second position, said first position having said first peg positioned above said first opening in said rail; and said second slider including a second slider plate with said second peg attached thereto, said second slider movable longitudinally along said second leg portion between a third position and a fourth position, said third position having said second peg positioned above said second opening in said rail.

17. The apparatus of claim 14 wherein said first head portion includes a first plug configured to engage said first opening in said top of said rail, said first plug having a top surface substantially flush with a top surface of said top of rail when said first leg is attached to said rail; and said second head portion includes a second plug configured to engage said second opening in said top of said rail, said second plug having a second top surface substantially flush with a top surface of said top of rail when said second leg is attached to said rail.

18. The apparatus of claim 14 further including a first slider and a second slider, said first slider including a first slider plate and a first tilting mechanism, said first tilting mechanism having a first rotating member with said first peg attached thereto, said first rotating member having a first locking mechanism that inhibits rotation of said first rotating member, said first slider movable longitudinally along said first leg portion between a first position and a second position, said first position having said first peg positioned above said first opening in said rail; and said second slider including a second slider plate and a second tilting mechanism, said second tilting mechanism having a second rotating member with second first peg attached thereto, said second rotating member having a second locking mechanism that inhibits rotation of said second rotating member, said second slider movable longitudinally along said second leg portion between a third position and a fourth position, and said third position having said second peg positioned above said second opening in said rail.

19. The apparatus of claim 14 further including a block dimensioned and configured to attach to a distal end of said rail between said first and second sides; and said block having a distal end flush with said distal end of said rail.

20. The apparatus of claim 14 wherein said rail is a first rail configured to attach to a second rail; further including a connector dimensioned and configured to attach to a distal end of said first rail between said first and second sides; and said connector having a distal end extending from said distal end of said first rail such that said second rail is attachable to said connector.

* * * * *